United States Patent [19]
Suzuki et al.

[11] Patent Number: 6,087,755
[45] Date of Patent: Jul. 11, 2000

[54] RADIAL GAP TYPE CYLINDRICAL MOTOR

[75] Inventors: Yuzuru Suzuki; Sakae Fujitani; Masaki Kagawa; Yoshiyuki Aono; Masato Hata; Kunitake Matsushita, all of Shizuoka-ken, Japan

[73] Assignee: Minebea Co., Ltd., Nagano, Japan

[21] Appl. No.: 09/136,039

[22] Filed: Aug. 20, 1998

[30] Foreign Application Priority Data

Aug. 20, 1997 [JP] Japan ..................................... 9-223967

[51] Int. Cl.[7] .................................................. H02K 37/00
[52] U.S. Cl. .......................... 310/254; 310/257; 310/216; 310/180; 310/42
[58] Field of Search ..................................... 310/254, 257, 310/258, 259, 216, 218, 194, 89, 49 R, 67 R, 180, 179, 42

[56] References Cited

U.S. PATENT DOCUMENTS

| | | | |
|---|---|---|---|
| 2,764,802 | 10/1956 | Feiertag | 29/596 |
| 4,503,368 | 3/1985 | Sakamoto | 310/49 R |
| 4,733,120 | 3/1988 | Kawabe | 310/268 |
| 4,972,109 | 11/1990 | Kakizaki et al. | 310/49 R |
| 5,719,456 | 2/1998 | Kolomeitsev | 310/112 |

*Primary Examiner*—Elvin Enad
*Assistant Examiner*—Burton S. Mullins
*Attorney, Agent, or Firm*—Staas & Halsey, LLP

[57] ABSTRACT

A motor structure having an armature yoke 1 including a cylindrical portion and a plurality of salient poles 20 formed in the radial direction on the circumference of one end of the cylindrical portion, characterized by having a stator coil 5 formed by a concentrated winding provided around a salient pole portion 20', which is formed by joining the salient poles 20 of two armature yokes 1 together, and a motor structure characterized by having the above described structure and further having a salient pole piece 11 disposed on the front end of the salient pole portion in confronting relationship with a rotor magnet 2.

37 Claims, 27 Drawing Sheets insert to the circuit board insert to the circuit board

RADIAL GAP TYPE CYLINDRICAL MOTOR

BACKGROUND OF THE INVENTION

1. Field of the Invention

The present invention relates to a structure of a radial-gap type cylindrical motor, a method of mounting a salient pole piece thereon, and a method of improving the strength of the bobbin assembly.

2. Description of the Prior Art

In order to provide a high performance apparatus at low cost, such a system in which a plurality of motors specialized in respective functions are used in one apparatus, the so-called "sectional drive" system, has come into general use. There are demands for motors, especially for small-sized DC motors, that are light in weight, improved in motor efficiency with the magnetic circuit efficiency increased according to uses, having a lower cogging torque, generating small electromagnetic noise, and good controllability. As countermeasures for meeting these demands, such practices are being generally made to increase the number of slots of the core, increase the number of magnetic poles of the magnet to thereby decrease the length of each magnetic circuit and improve the magnetic efficiency, and to provide each salient pole with a coil of concentrated winding to thereby improve the efficiency of the winding work.

In the case of a flat, outer rotor type DC brushless motor widely used as the spindle motor for a magnetic memory device and the like, on account of a relatively small number of laminations of the core, construction of an armature structure having good efficiency/controllability was achieved as disclosed in Japanese Patent Application No. Hei 1-95928 (refer to the gazette of Japanese Patent Laid-open No. Hei 2-276449, hereinafter referred to as the prior art). More specifically, in view of its geometric configuration, it is very easy to set the sectional form characteristic coefficient $R (=L^2/A)$, where A is the sectional area of the salient pole portion of the core and L is the length surrounding the salient pole portion, at such a value as satisfies the technological requirements described in the above patent application. Namely, it was easily attained to improve the motor performance by designing the sectional form of the salient pole portion to have a virtually square shape and allowing the flux density in the salient pole portion to match with the resistance value of the coil winding provided around the salient pole portion (to reduce the resistance value of each turn of the coil).

However, in the case of a motor for driving the carriage of a printer and the like, since the motor mounting space is small in spite of the relatively large mechanical output required of it, such measures are frequently taken to structure it in a cylindrical form and make the number of the laminations of the core as many as possible. In the design of the core of the DC brushless motors, a generally employed structure is such an armature that has laminations of a plurality of thin cores, including groove portions (hereinafter called "slots") for receiving coils and yoke portions for forming magnetic circuits (to be provided with concentrated coil windings and disposed in confronting relationship with the magnet across an air gap, hereinafter called "salient poles"), and is provided with insulation at necessary portions of the slot parts of the core and coil windings provided around the salient poles. Since this structure can change its characteristic only by laminating the needed number of cores of the same form in the axial direction, such an effect can be obtained, if there are, at hand, only the same form of metal die for pressing the cores, that the motor characteristic can be set at will by changing the number of the laminations. It further has such a feature that the iron loss is relatively low because the cores are electrically insulated.

However, in the laminated structure, especially that of a cylindrical type, the motor efficiency is liable to decrease greatly when the number of the salient poles is increased or the number of the poles of the magnet is increased. More specifically, in order to increase the mechanical output of the cylindrical type, it becomes necessary to increase the number of laminated cores. Although this method contributes to an increase in torque, the motor performance cannot be improved in spite of the increase in the number of laminated cores because of the following two reasons:

1) In general, it is preferred that the flux density in the salient pole portion is raised as high as just below the point of magnetic saturation. However, if the number of the laminated cores is increased to increase the torque, the sectional area of the yoke is also increased (the sectional area is proportional to the number of laminated cores) and, hence, the optimum flux density in the salient pole portion cannot be attained. Especially in the case of multipole/multi-slot structure, the width of the salient pole portion can be very small when the sectional area of the salient pole is considered. Then, however, the width becomes too narrow as against the core thickness and there arises such a difficulty that the core cannot be processed by stamping. Accordingly, the flux density in the salient pole portion cannot be increased to the optimum level.

2) When the number of laminations is increased, the effective line element of the coil generating the torque becomes longer. However, the resistance value of the coil increases correspondingly and the motor efficiency decreases. Especially, such a coil winding provided around a narrow and long sectional area has a demerit that it only increases the resistance value and greatly deteriorates the motor efficiency.

Accordingly, in the laminated structure of the cylindrical type, the sectional form of the salient pole portion inevitably becomes worse (it becomes an oblong in which the difference between the long side and the short side is great). Hence, in the light of the prior art, it becomes unable to match the flux density in the salient pole portion with the resistance value of the coil provided around the salient pole portion. Namely, it becomes impossible to define the sectional area of the salient pole portion so as to provide the optimum flux density suitable for the motor. More specifically, there have been such problems to be solved that waste of the material of the stator is produced and, at the same time, the weight of the motor is increased and, further, the motor efficiency is deteriorated.

Furthermore, the electromagnetic noise produced at the time of commutation of the motor coil for use in either the magnetic memory device or the printer is regarded as harmful also by regulations in recent years. Therefore, it is desired that such noise is positively suppressed at a low cost.

The present invention is made in view of the above described situation and it is an object of the present invention to provide a motor structure, not using the structure to laminate a large number of cores of the same form in the axial direction, i.e., the so-called lamination structure, though it is of a radial gap, cylindrical motor, but being light, economical, high in performance, and generating a small amount of electromagnetic noise, and a method of mounting salient pole pieces thereon.

SUMMARY OF THE INVENTION

In the inner rotor type, such a motor structure has been constructed in which two armature yokes, having salient poles and formed in a cup shape with a flat bottom, are fixed back to back with their bottom faces in abutment with each other and, in addition, with the salient poles of the armature yokes on the left and right sides registered with each other along the circumference, and, further, coils of concentrated winding are put on the thus formed salient pole portions. Thereby, a structure of the salient pole portion having a good sectional form characteristic (having a low sectional form characteristic coefficient) has been provided.

Further, in order to adjust the flux density in the salient pole portion, a flux density adjusting yoke capable of adjusting the flux density in the salient pole portion is interposed between the bottom faces of the armature yokes, whereby it is easily attained to realize the required minimum sectional area that will not cause magnetic saturation in the salient pole portion.

Further, such a motor structure has been made in which the width of the salient pole is constant along the radial direction so that a coil assembly with a coil winding provided on a bobbin can be put on each salient pole and, therefore, it has become possible to provide coil assemblies facilitating the winding work greatly and being highly reliable (the insulation is ensured) at low cost.

Further, by providing a salient pole piece, which converges the magnetic flux from the rotor magnet, disposed at the front end of the salient pole (at the portion facing the magnet across the air gap), it has become possible to effectively interlink the magnetic flux, even if it is generated from an elongated (cylindrical) rotor magnet, with the coil.

As a result, even in a cylindrical, multipole/multi-slot (salient pole) motor, it has become possible to considerably suppress the sectional form characteristic coefficient of the salient pole portion without saturating the magnetic flux and to improve the matching between the flux density in the salient pole portion and the resistance value of the coil winding provided around the salient pole portion (to reduce the resistance value for each turn of the coil), to thereby improve the motor performance. Further, by designing special form of the salient pole piece being a separated structure from the salient pole portion (by providing the salient pole piece with grooves or skew), it has become possible to control the cogging torque with ease. Further, by disposing/mounting a core containing a magnetic soft material for absorbing electromagnetic noise on each coil assembly provided with a coil winding on a bobbin in such a way that it interlinks electromagnetically and directly with the current flowing through the coil, it has become possible to greatly reduce the electromagnetic noise emitted to the outside when the motor is excited.

Further, the invention also provides a method of reinforcing the coil assembly provided with a coil winding on a bobbin and a method of mounting and fixing the salient pole piece on the salient pole front end portion.

DESCRIPTION OF THE PREFERRED EMBODIMENTS

Figure 1:
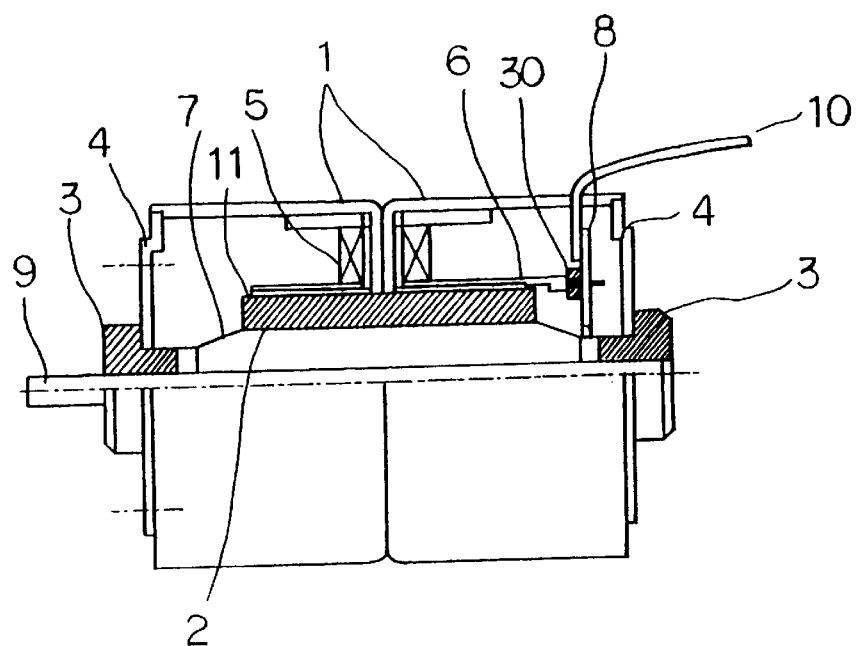
FIG. 1 is a side sectional view showing a first embodiment of the invention.
Figure 2:
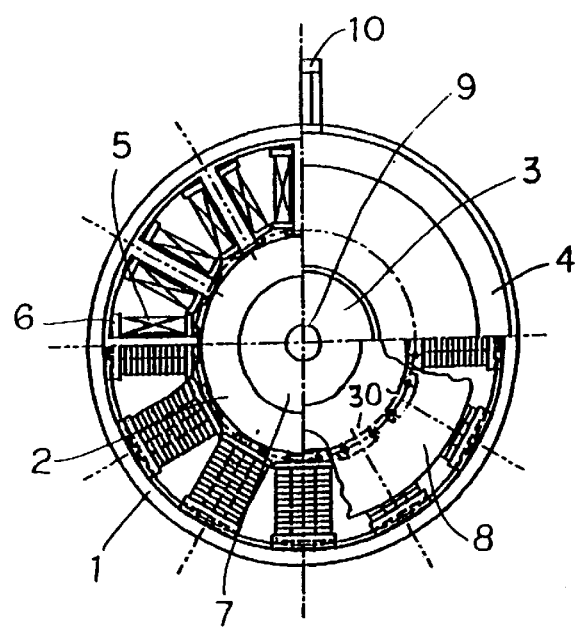
FIG. 2 is a front view with a portion broken away of the embodiment of the invention.

An embodiment of the invention will be described in detail with reference to the accompanying drawings. FIG. 1 and FIG. 2 are a sectional view and a front view with a portion broken away, respectively, of a first embodiment of the invention. The motor shown in these drawings is a three-phase, DC brushless motor of a radial gap, cylindrical, inner rotor type made up of the so-called 16-pole rotor having 16 magnetic poles disposed along the circumference of the rotor, of which each pole is magnetized along the length of the axis of rotation, and a stator of which the number of salient poles (slots) is 12. First the stator portion will be described. Reference numeral 1 denotes an armature yoke made in a cup shape of a metal of a ferromagnetic material. There are disposed two armature yokes 1 virtually of the same form fixed together by being brought into abutment with each other from left and right in such a way that their multiple salient poles (described later in detail) formed integrally with the bottom face of each thereof register with each other along the circumferential direction.

Reference numeral 6 denotes a bobbin put on the salient pole portion (described later in detail), which is formed of a resin to secure the insulation of the coil. Reference numeral 5 denotes a coil provided around the bobbin 6. The end of the coil 5 is wrapped around a terminal (described later in detail) provided under the collar of the bobbin 6 and electrically connected to a connection board 8. The connection board 8 is adapted to receive necessary electric energy through lead wires 10 (four in number, in the present embodiment, three being for the three-phase star connection and one being for the neutral line). Denoted by 30 disposed between the bobbin 6 and the connection board 8 in this embodiment is a core made of a soft magnetic, soft ferrite material. The core 30 has two holes bored therein to be fitted on the terminals of the bobbin 6 and, thus, the core 30, while serving also as a spacer between the bobbin 6 and the board 8, serves as an electromagnetic noise absorber (described later in detail). Reference numeral 11 denotes a salient pole piece (described later in detail), disposed at the bobbin collar portion, for converging the magnetic flux from the rotor magnet onto the face in confronting relationship with the magnetic pole of the rotor magnet across the air gap. At the opening end portions of the two cup-shaped armature yokes 1, there is disposed a flange 4 provided with a bearing 3.

Now, the rotor portion will be described. Reference numeral 9 denotes a revolving shaft rotatably borne by the above mentioned bearing 3. Over the revolving shaft 9 is press-fitted a sleeve 7. On the outer periphery of the sleeve 7, there is fixed, by adhesion or the like, the rotor magnet 2 having 16 poles magnetized in the circumferential direction. Therefore, by exciting, sequentially and at suitable timing, the coils 5 of the stator in respective phases across the air gap, a torque is generated in the rotor magnet 2 and thereby a mechanical output can be obtained from the revolving shaft 9. Since the motor of the above described structure is the same as a general three-phase, DC brushless motor (the present embodiment is a motor of a sensor-less structure and has no position detector of the motor magnetic pole incorporated therein), description about the driving of the motor will be omitted.

Figure 3:
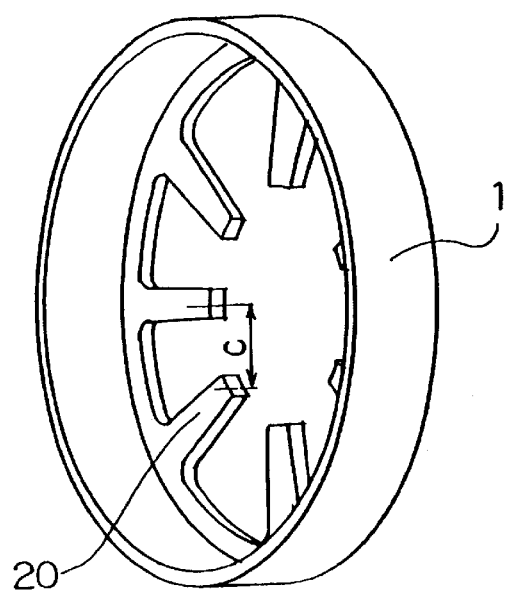
FIG. 3 is a perspective view showing an armature yoke.

FIG. 3 is an enlarged perspective view of the armature yoke 1. On the bottom face of the cup-shaped armature yoke 1, there are provided 16 salient poles radially disposed at equal pitches. The salient pole 20 is formed to have the same width along the radial direction. The line connecting the front ends of the salient poles 20 with each other lies on the same circumference so that the rotor magnet 2 can be put in the center portion with a small air gap left along the circumference as shown in FIG. 1. As the material of the armature yoke 1, a ferromagnetic material through which magnetic flux is passed well is preferred. Though a metallic material is considered good when press workability is considered, a resin mold containing powder of a magnetic soft material may be used to obtain good magnetic characteristics.

Figure 4:
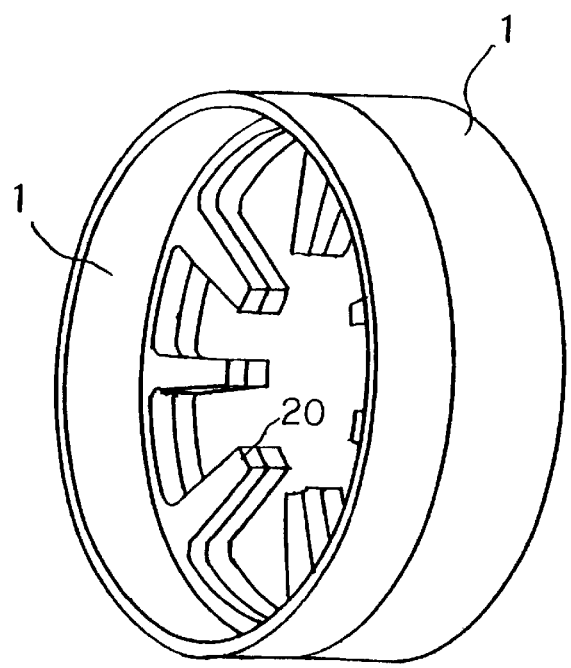
FIG. 4 is a perspective view showing a state of two armature yokes put upon each other.

FIG. 4 is a perspective view showing two armature yokes 1 fixed together such that their bottom faces are held in abutment with each other. Referring to FIG. 4, it should especially be noted that the salient poles 20 of the pair of the armature yokes 1 are concentrically disposed and registered with each other in the circumferential direction. By this positional arrangement, it is made possible for the rotor magnet 2 to have a minute air gap left along its circumference and for bobbins 6 to be inserted in place (described later in detail). In the description of the present invention, a single salient pole 20 of the armature yoke 1 is briefly called "salient pole" but the whole of the salient poles 20 in their laminated state is called "salient pole portion".

Figure 5:
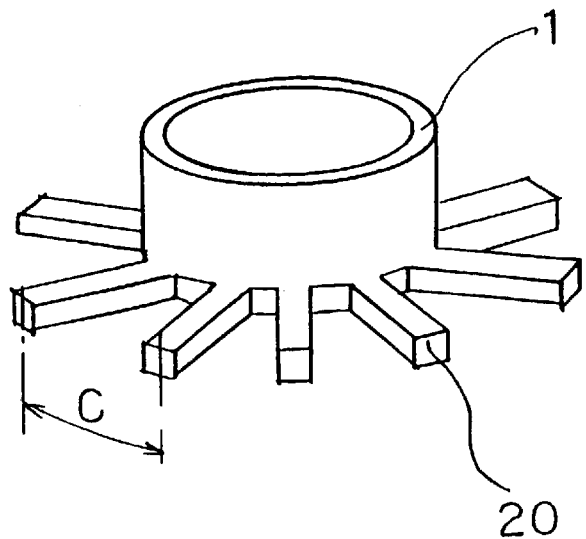
FIG. 5 is a perspective view showing another embodiment of an armature yoke.
Figure 6:
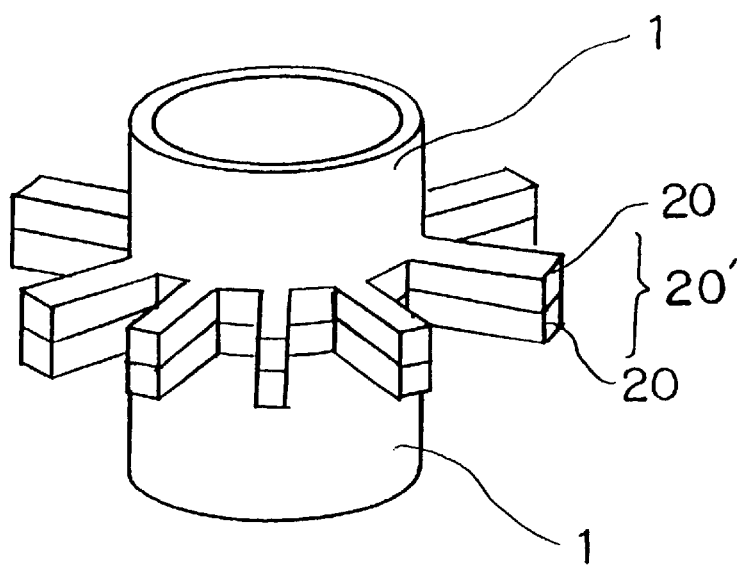
FIG. 6 is a perspective view showing a state of two pieces of the armature yokes shown in FIG. 5 put upon each other.
Figure 12:
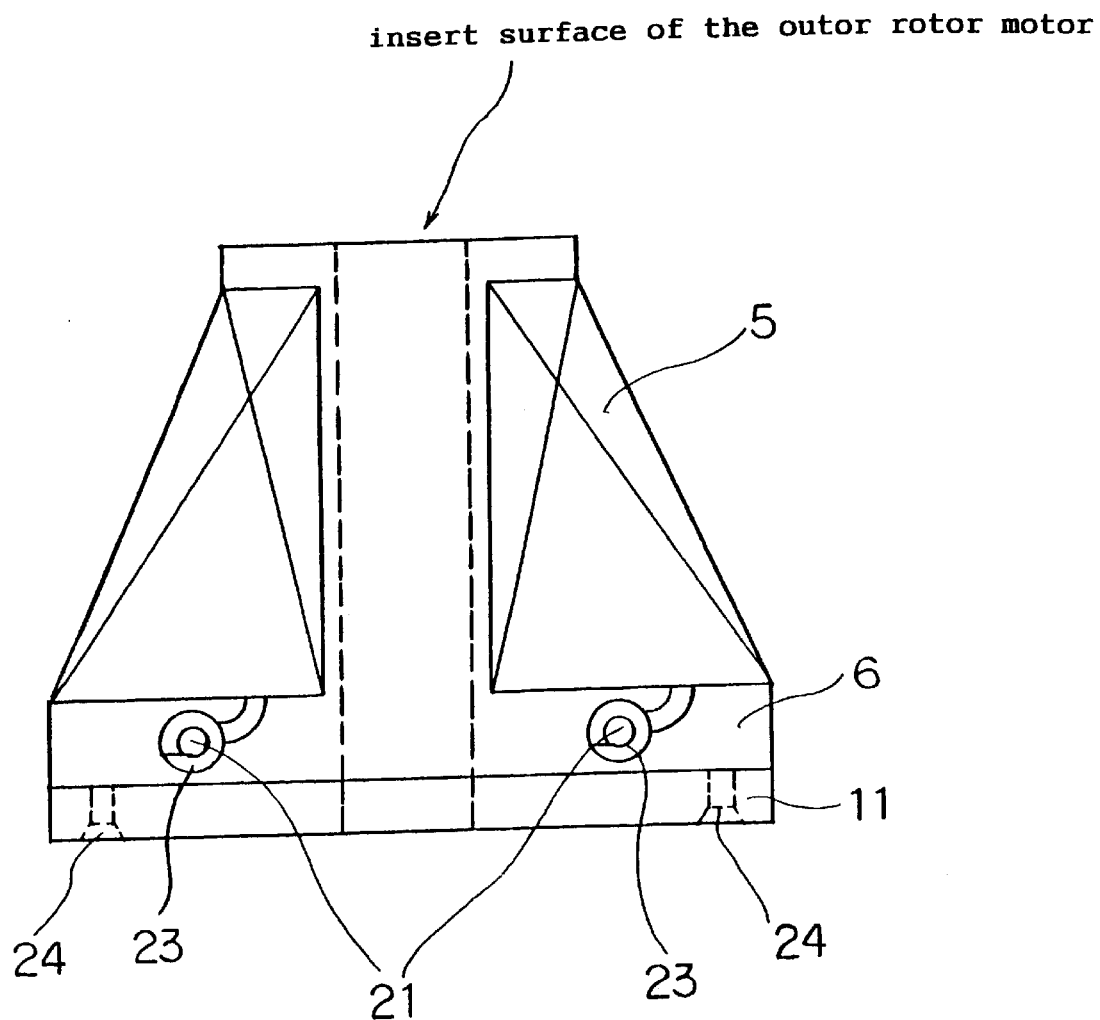
FIG. 12 is a front view of a coil assembly applicable to an outer rotor type.

While the present invention has so far been described as related to its example as an inner rotor type motor, the invention can also be applied to an outer rotor type motor. A form of an armature yoke of an outer rotor type is shown in FIG. 5. Its difference from the inner rotor type lies only in the bent direction of the salient poles 20 attached to one end face of the cup-shaped armature yoke 1. Namely, while the bent direction in the inner rotor type is toward the center of the cylindrical cup shape, that in the outer rotor type is away from the center. FIG. 6 shows two armature yokes 1 disposed such that their salient poles 20 register with each other. As shown in the drawing, it is characteristic of the outer rotor type that the salient poles 20 are projecting toward the circumference, thereby expanding the pitches of the portions of opening, so that it is made easier to provide a coil winding around the salient pole portion 20'. When the coil winding is provided on a bobbin, such a merit is obtained that the bobbin can be put on the salient pole portion much easier and, at the same time, the number of turns of the coil in the bobbin can be increased and this is advantageous also for improving the motor performance. The reason why is that, in the case of the outer rotor type, different from the case of the inner rotor, the wire can be coiled in an isosceles trapezoidal form around a bobbin and the same is inserted from the upper base side (short side) of the isosceles trapezoid, narrower in coil width, to be put on the salient pole portion 20' (refer to FIG. 12).

The invention is not limited to such a three-phase, DC brushless motor having the magnetic poles of the rotor magnet being 16 in number and having the slots being 12 in number as with the first embodiment, but the number of the phases, the number of the magnetic poles of the rotor magnet, and the number of the slots can be varied. The motor of the invention is suited especially for constructing multipole/multi-slot motors for the reason as described above.

Further, the invention is applicable not only to the DC brushless motors, but also to synchronous motors of a radial gap type with a salient pole structure.

Figure 7:
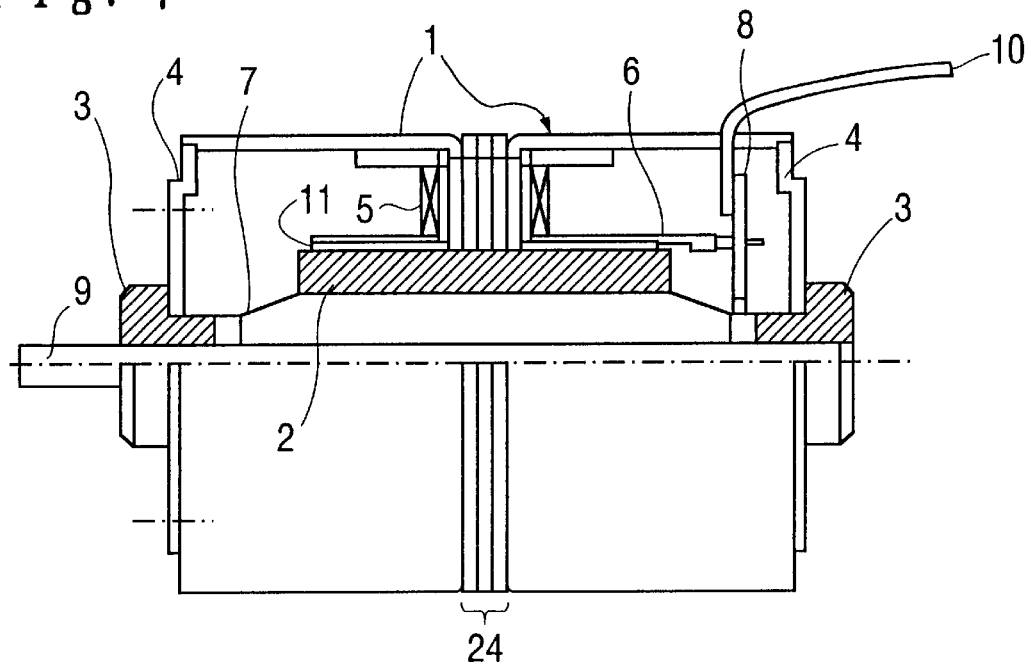
FIG. 7 is a side view showing a state of a flux density adjusting yoke interposed between salient poles.

FIG. 7 is a side view with a portion broken away of a second embodiment of the invention. The point in which it is different from the first embodiment is only that a flux density adjusting yoke 24 formed of three metallic plates of a ferromagnetic material is inserted between the bottom portions of two armature yokes 1. Since other parts are the same, they are denoted by corresponding reference numerals and description of such parts that are not to be specifically described is omitted. By means of the flux density adjusting yoke 24, the flux density in the salient pole portion 20' can be adjusted. Namely, when there is only the sectional area of the salient pole portion 20' formed by a pair of the armature yokes 1 as with the first embodiment, it sometimes occurs that the flux density is increased greatly (because the sectional area is too small) and becomes saturated. In that event, the flux density adjusting yoke 24 substantially increases the sectional area of the salient pole portion and, hence, the flux density in the salient pole portion is prevented from saturating. Hence, the metal plates forming the flux density adjusting yoke 24 are not limited to three in number and the thickness of the plate is not limited to be the same as that of the armature yoke 1 as with the present embodiment.

Figure 9:
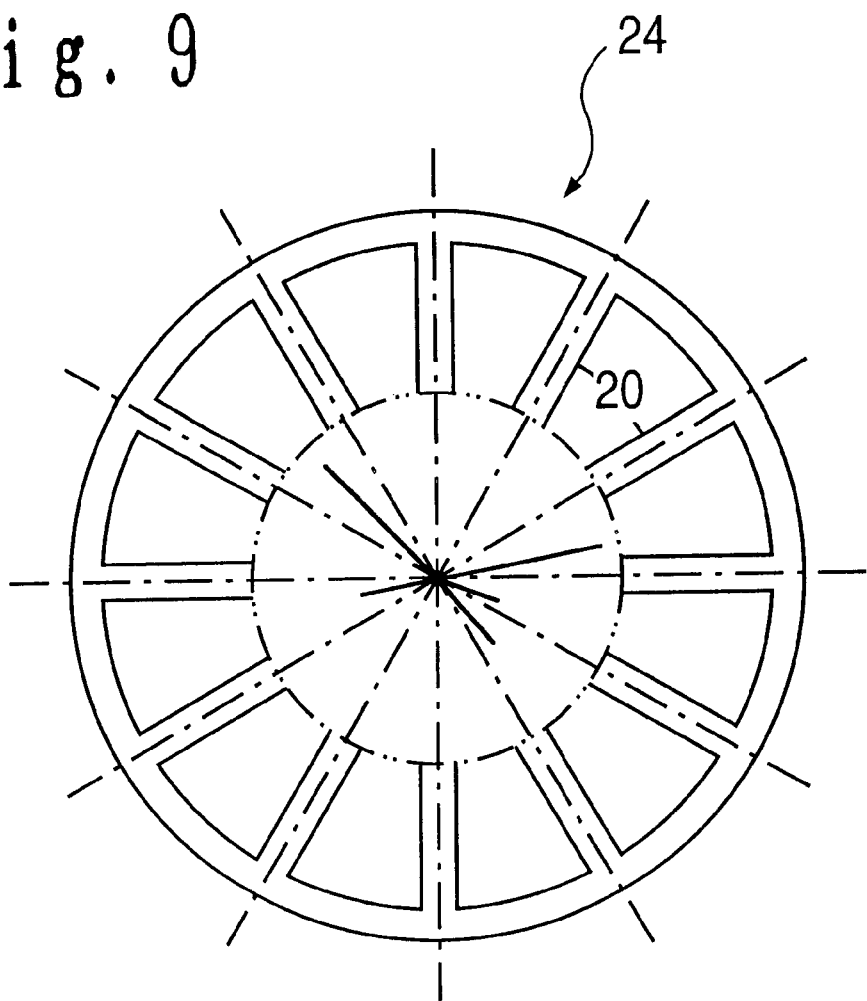
FIG. 9 is a front view of a flux density adjusting yoke.

FIG. 9 shows the form of the flux density adjusting yoke 24 used in the second embodiment. The flux density adjusting yoke 24 is of the same form as the bottom face of the armature yoke 1 and it is fixed onto the armature yoke 1 in such a way that it is concentrical with the armature yoke 1 and their salient poles 20 register with each other along the circumference. Namely, since the salient pole 20 of the armature yoke 1 and the salient pole 20 of the flux density adjusting yoke 24 are laminated (added up) in the axial direction, the substantial sectional area of the salient pole portion is correspondingly increased. Incidentally, the flux density adjusting yoke 24 in the present embodiment is provided by punching it out of a cold rolled steel plate being 1.2 mm thick.

Figure 8:
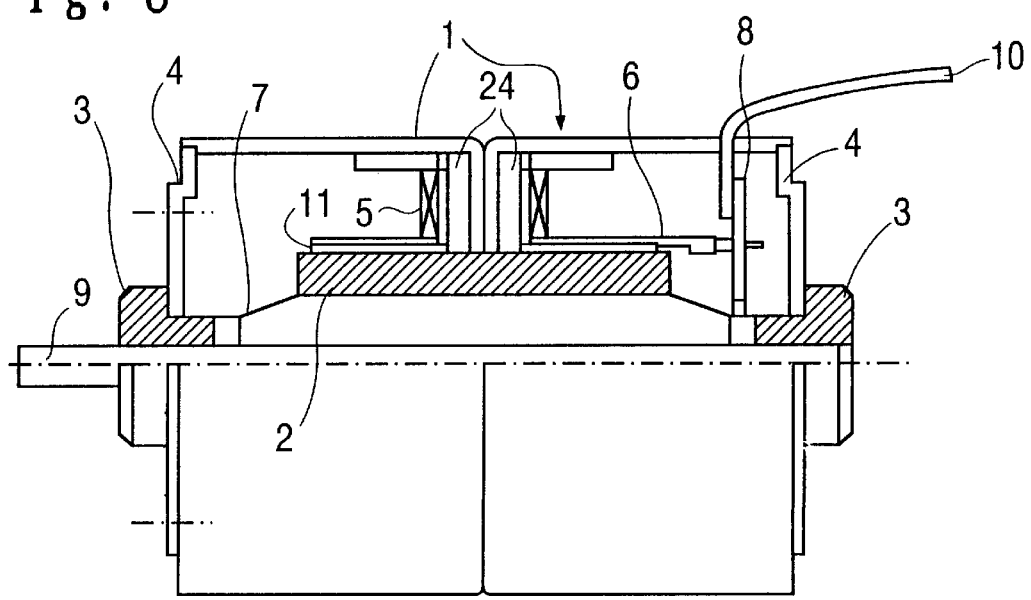
FIG. 8 is a side view with a portion broken away showing another embodiment of a flux density adjusting yoke.

In the case shown in FIG. 8, instead of having the flux density adjusting yoke 24 interposed between the outer sides of the bottom portions of the armature yokes 1, a flux density adjusting yoke 24 having a little smaller diameter than the inner diameter of the armature yoke 1 and formed of a necessary number of plates (one plate each and, hence, two plates in all, in this embodiment) is disposed on each of the inner bottom faces of the armature yokes inserted from the opening side (the side on which the flange 4 is disposed) of each of the cup-shaped armature yokes 1 to thereby substantially increase the sectional area of the salient pole portion 20'.

It is natural that the flux density adjusting yoke 24 produces smaller eddy current loss when it is formed of thin plates and the plates are insulated from each other. It is also possible to provide the flux density adjusting yoke 24 by a resin molding with powder of a soft magnetic material mixed therein.

Figure 10:
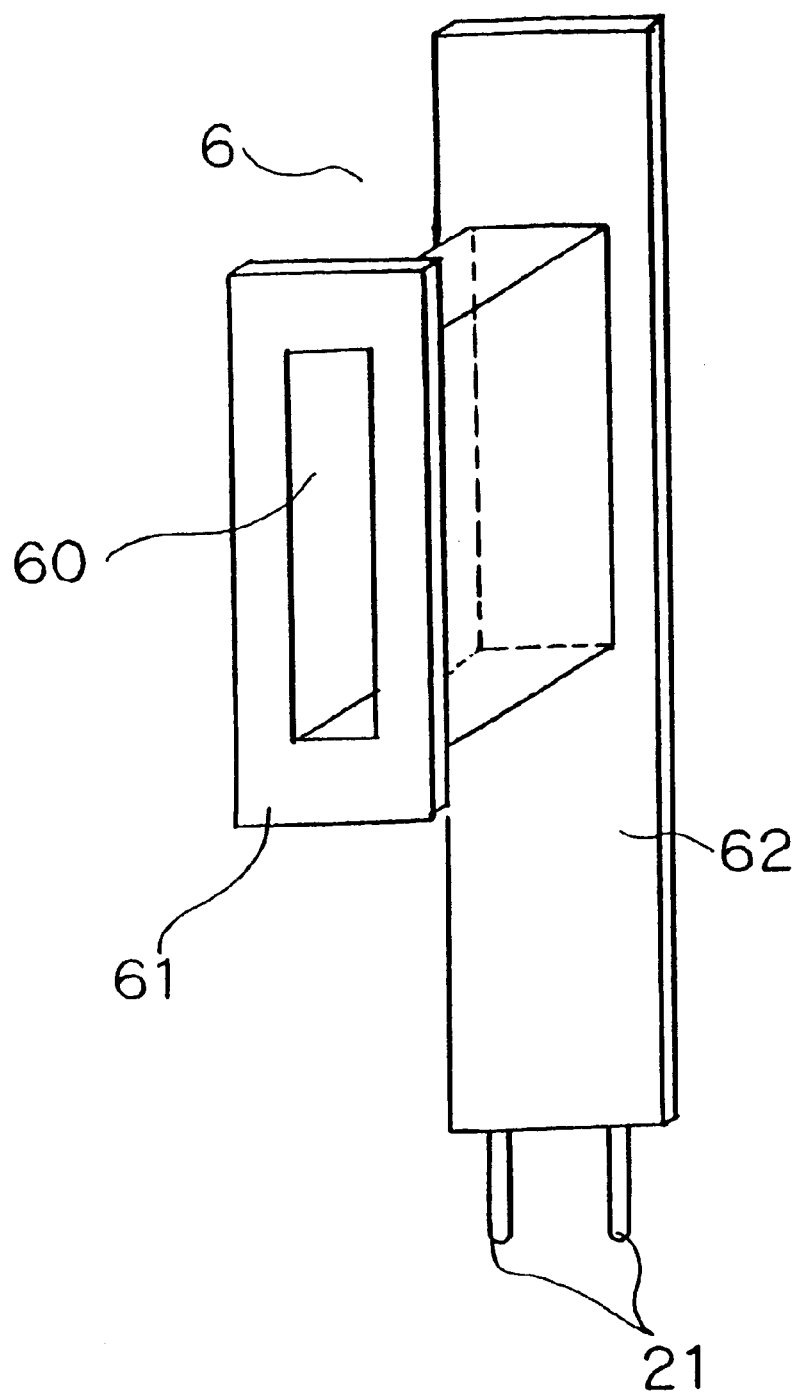
FIG. 10 is a perspective view of a bobbin.
Figure 11:
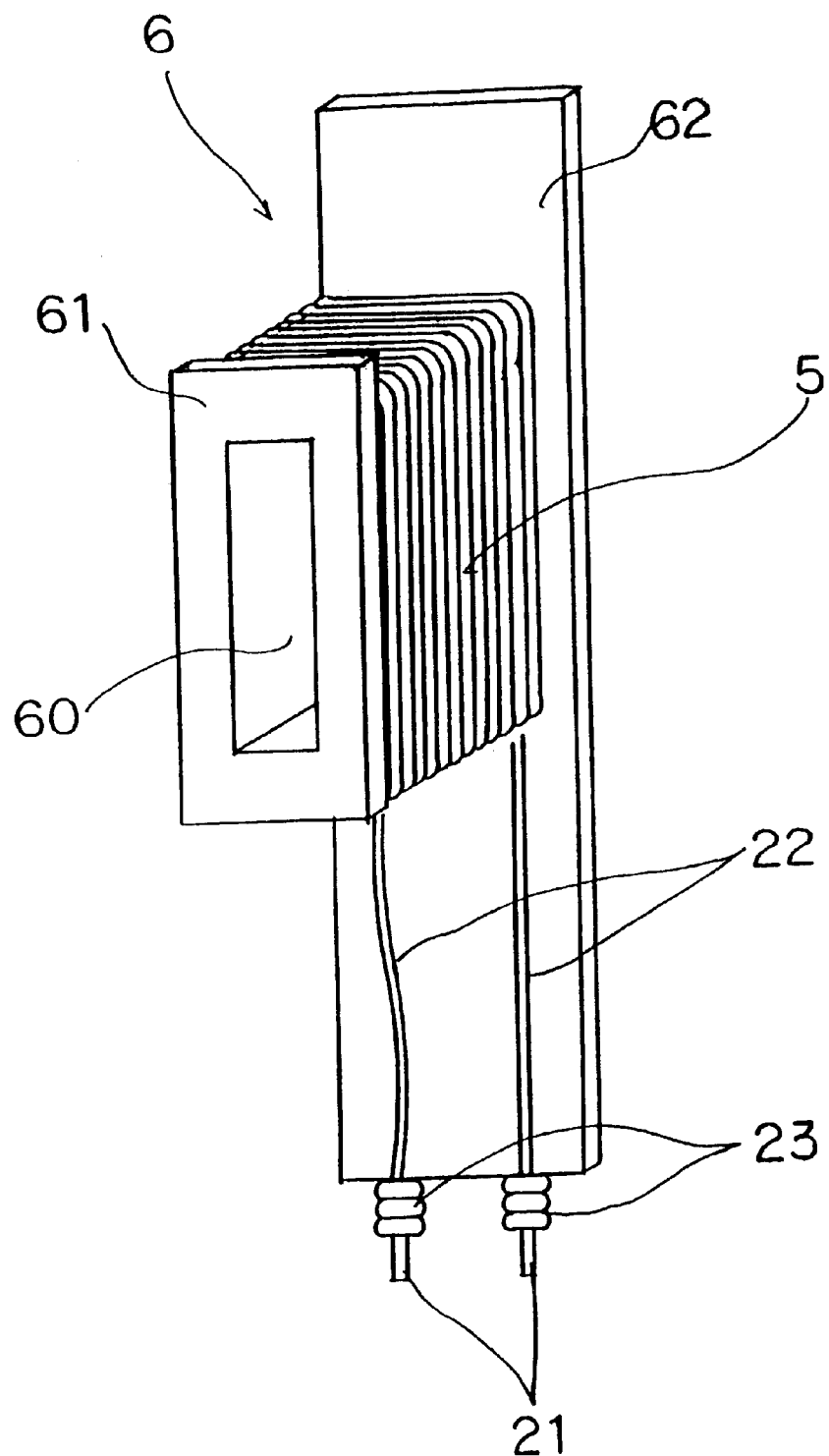
FIG. 11 is a perspective view of the bobbin shown in FIG. 10 with a coil winding provided thereon.

FIG. 10 shows a bobbin 6 provided by a resin molding. The bobbin 6 is of a form having a square hole 60 made in the center for inserting the salient pole portion 20' therein and collars 61 and 62 different in length provided on both sides. The long collar 62 is on the side facing the rotor magnet, in the present embodiment, and there are terminals 21 provided at the lower end thereof for connection with the coil by wire-wrap connection. FIG. 11 shows a state of a coil assembly having the winding of a coil 5 provided around the bobbin 6. When assembled, the ends of the two coil ends 22 are wrapped around the terminals 21 and applied with deposit soldering at the portions 23. Therefore, by employing the bobbin of the described structure, the process from the winding to the deposit soldering can be carried out as a through process and, hence, inspecting/assembling workability can be improved and the assembly can be fabricated quickly.

Figure 13:
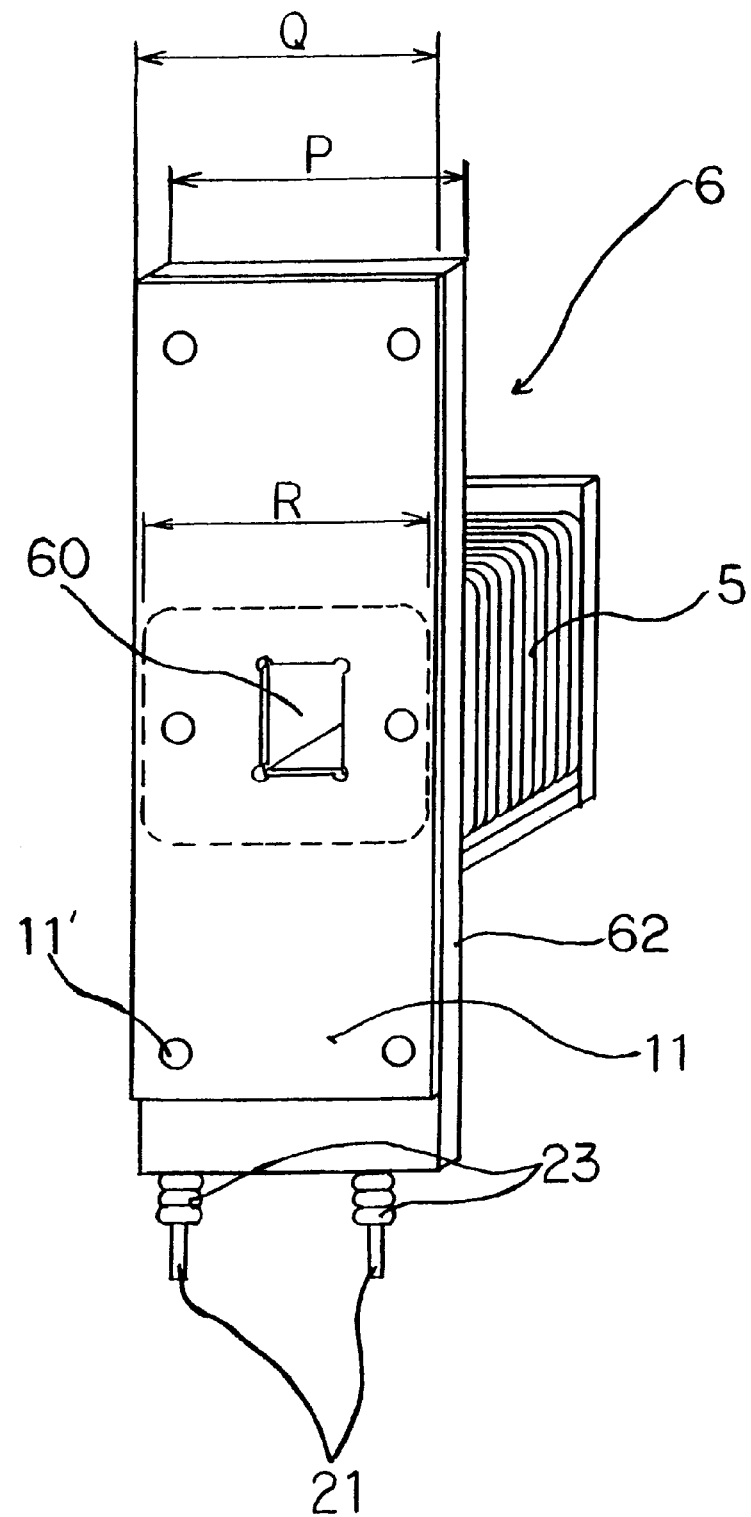
FIG. 13 is a perspective view showing a state of a coil assembly with a salient pole piece mounted thereon.

FIG. 13 is a perspective view showing an assembly, the so-called yoke assembly, in which a salient pole piece 11 is disposed at the collar portion of the bobbin 6, i.e., on the face of the bobbin 6 of the coil assembly shown in FIG. 11 facing the rotor magnet 2 across an air gap. Since its difference from the coil assembly shown in FIG. 11 is only that the salient pole piece 11 is added to this assembly, like parts are denoted by like reference numerals. Reference numeral 11' in FIG. 13 denotes a caulked portion where the salient pole piece 11 is fixed onto the bobbin 6 by hot caulking. Also, the salient pole piece 11 may be fixed onto the bobbin 6 by adhesion, by insert molding, or by bending the salient pole piece. The square hole 60 in the center of the salient pole piece 11 is the hole to be fitted on the salient pole portion 20'. The magnetic coupling between the members there, in this embodiment, is provided by fitting one into the other but may also be provided by welding or caulking. Further, in the case of FIG. 13, the salient pole piece 11 is flat and the width P of the collar portion 62 of the bobbin 6 and the width Q of the salient pole piece 11 are the same. By making these sizes P and Q, including the width R of the widest portion of the coil winding, equal to or smaller than the pitch C between the salient poles 20 (refer to FIG. 3 and FIG. 5), it becomes possible to insert the coil assembly through the opening to put it on the salient pole portion 20' even from inner circumferential side where, in the case of the inner rotor type, the inlet is narrow. Although similar restrictive condition exists in the outer rotor type as described before, insertion of the coil assembly is easier in the outer rotor type than in the inner rotor type because the coil assembly can be inserted from the outer circumferential side where the inlet is wide open, and, further, the number of turns of the coil can be increased (refer to FIG. 12).

Figure 14:
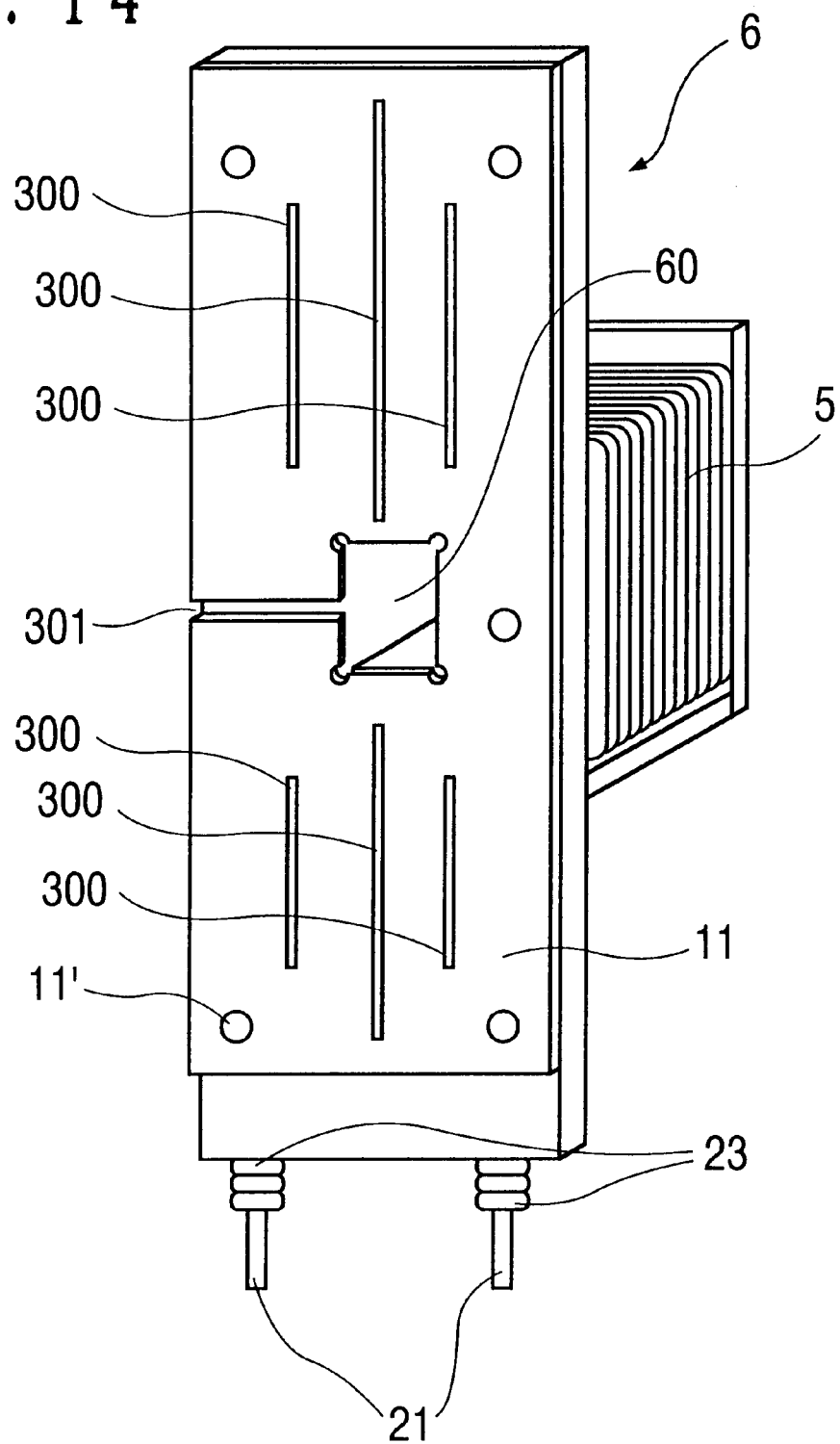
FIG. 14 is a perspective view showing a state of a salient pole piece in which a groove and slits are formed.

FIG. 14 is an embodiment of the salient pole piece 11 additionally provided with a groove 301 and slits 300 made therein. By the groove 301/slits 300, the eddy current to be produced in the salient pole piece 11 facing the rotor magnetic pole face and receiving alternating magnetic field therefrom can be cut off and the eddy current loss reduced. The groove 301 (shown as one in number) is effective in cutting off the eddy current flowing concentrically with the square hole to be fitted on the salient pole 20. The slits 300 (shown as six in number) are effective in cutting off the eddy current circulating through the wide areas of the salient pole piece 11 on the upper side and the lower side. Instead of providing both of the groove 301 and the slits 300 at the same time, one of them which is effective in reducing the eddy current loss only may be employed. Further, similar effect will be obtained by providing groove/slit at necessary portions in the belt-shaped salient pole piece 11 which is to be described with reference to FIG. 23. The positions, numbers, and shapes (width and length) of the groove 301 and slit 300 are not limited to those shown in FIG. 14 but may be varied provided that they do not lessen the effect of convergence of magnetic flux from the rotor magnet and cut off effectively the eddy current produced in the salient pole piece 11.

Figure 15:
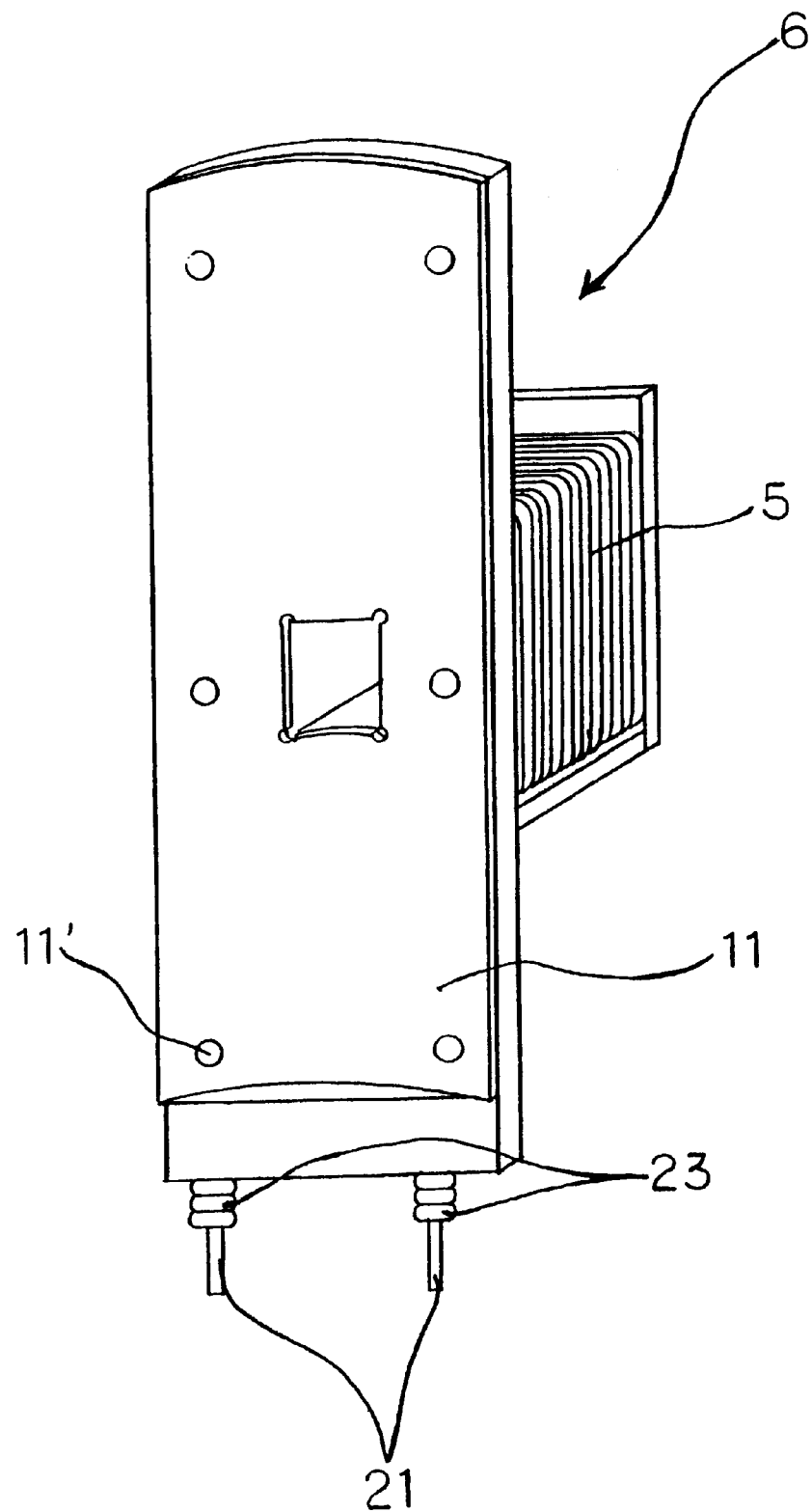
FIG. 15 is a perspective view showing another embodiment of a coil assembly.

FIG. 15 is a perspective view showing another embodiment of the coil assembly. The point of the same differing from that shown in FIG. 14 is that the salient pole piece 11 is not of a flat form but a curved form having curvature. Therefore, this salient pole piece 11 has narrower air gap, on average, than that of a flat form shown in FIG. 14 when both the salient pole pieces 11 are assumed to have the same form (sectional area) and, accordingly, the rate of convergence of the magnetic flux from the rotor magnet 2 can be increased.

Figure 16:
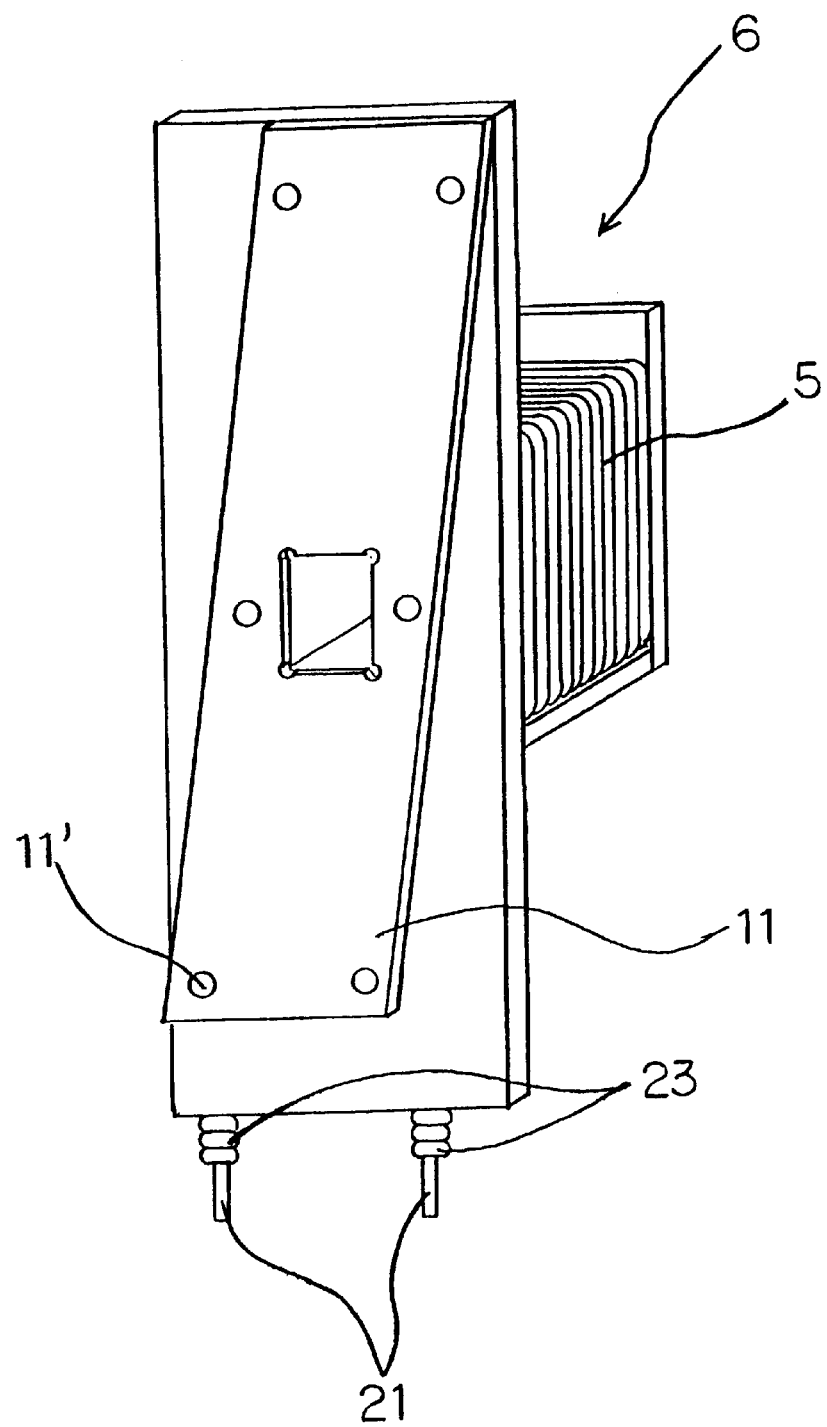
FIG. 16 is a perspective view showing a state of a salient pole piece provided with skew.
Figure 17:
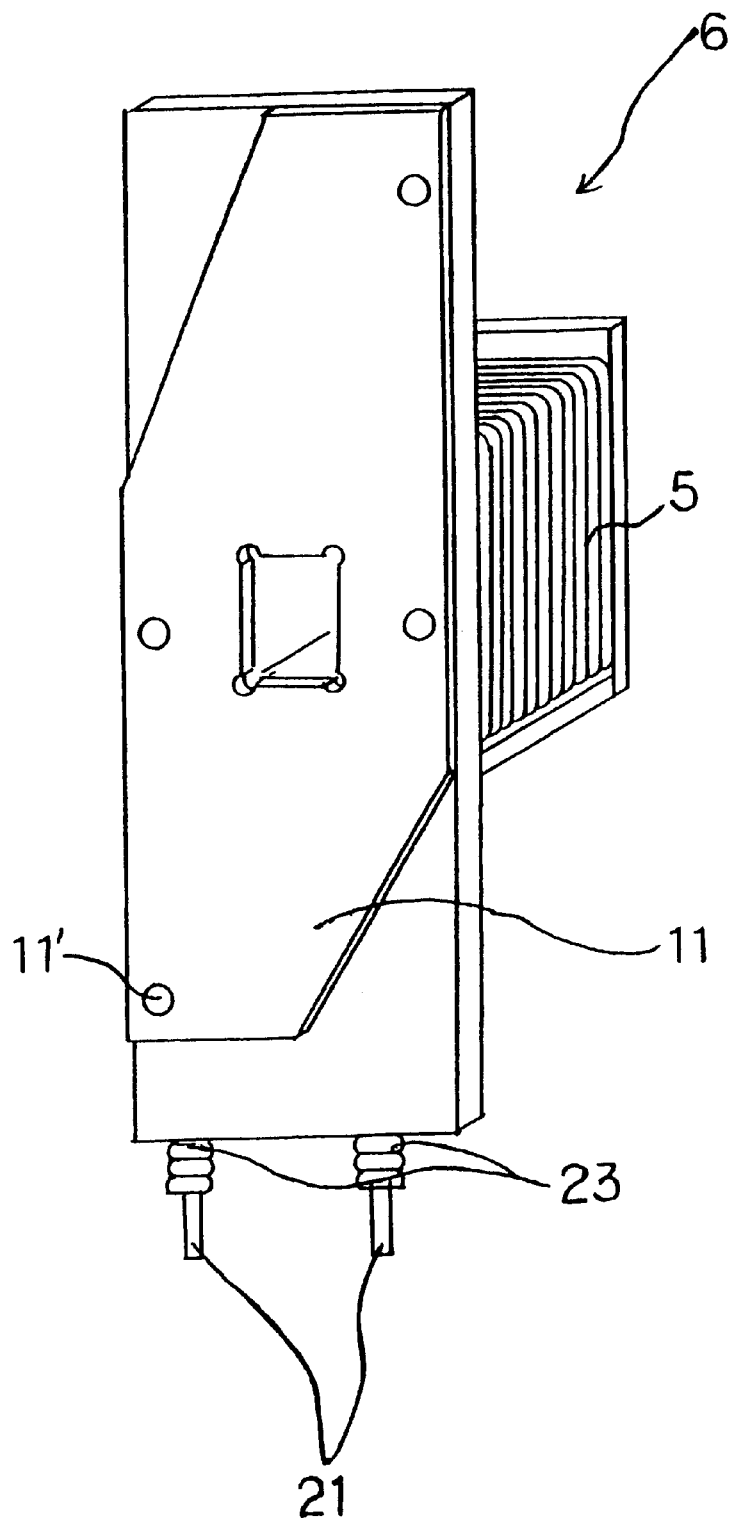
FIG. 17 is a perspective view showing another state of a salient pole piece provided with skew.
Figure 18:
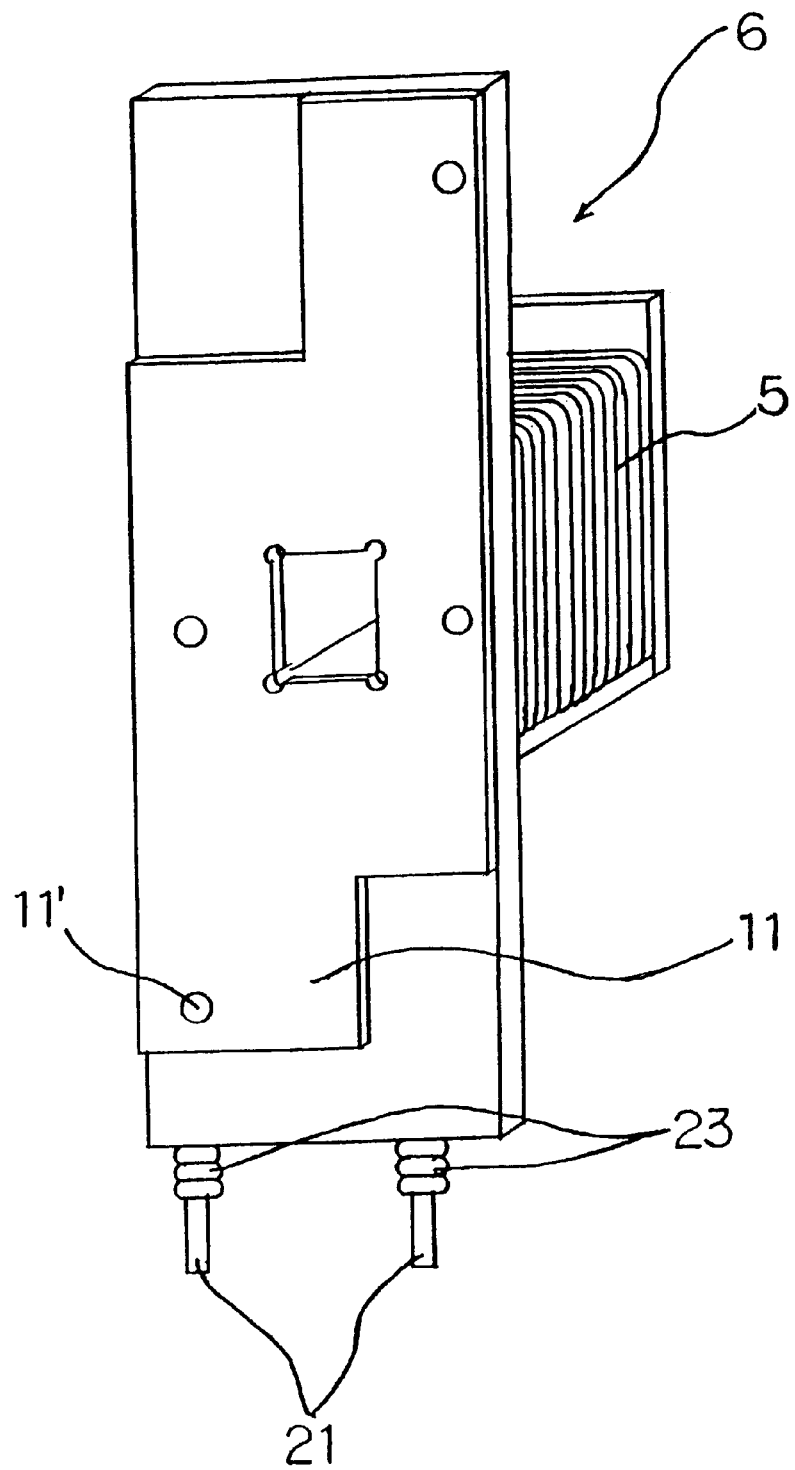
FIG. 18 is a perspective view showing another state of a salient pole piece provided with skew.
Figure 32:
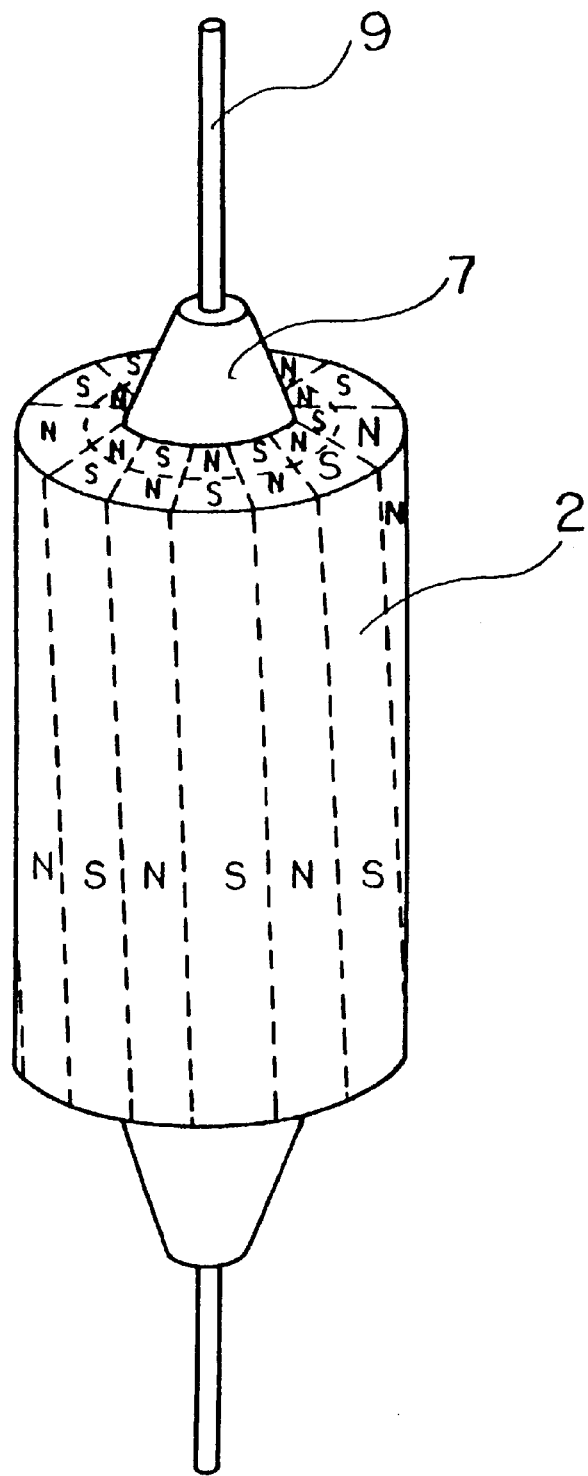
FIG. 32 is a perspective view of a rotor magnet in which the magnetic poles are provided with skew.

Some other embodiments of the coil assembly are shown in FIG. 16 to FIG. 18, in which corresponding parts to those in FIG. 13 to FIG. 15 are denoted by corresponding reference numerals and, hence, description of the same will be omitted. In these embodiments, forms of the salient pole piece 11 are especially devised for the purpose of improving (reducing) the cogging torque. FIG. 16 shows the embodiment of a first salient pole piece provided for improving the cogging torque. By forming the salient pole piece 11 in a parallelogrammatic shape instead of the rectangular shape, magnetic skew is formed. By having the salient pole piece formed in such a parallelogrammatic shape, the permeance in the circumferential direction can be gradually changed. FIG. 17 shows the embodiment of a second salient pole piece provided for improving the cogging torque. By cutting two corner portions on one diagonal, in a triangular shape, off the rectangular salient pole piece 11, the permeance in the circumferential direction is gradually changed as with that shown in FIG. 16. FIG. 18 shows the embodiment of a third salient pole piece provided for improving the cogging torque. By cutting two corner portions on one diagonal, in a square shape, off the rectangular salient pole piece 11, the permeance in the circumferential direction is changed step-wise differing from that shown in FIG. 17. The shapes of the salient pole piece 11 for reducing the cogging torque are not limited to those described above. Further, similar effect to reduce the cogging torque will be obtained, not by providing the salient pole piece 11 with skew (structures shown in FIGS. 13, 14, 15, 19, and 22), but by providing skew by means of magnetization of the rotor magnet 2 (refer to FIG. 32).

Figure 19:
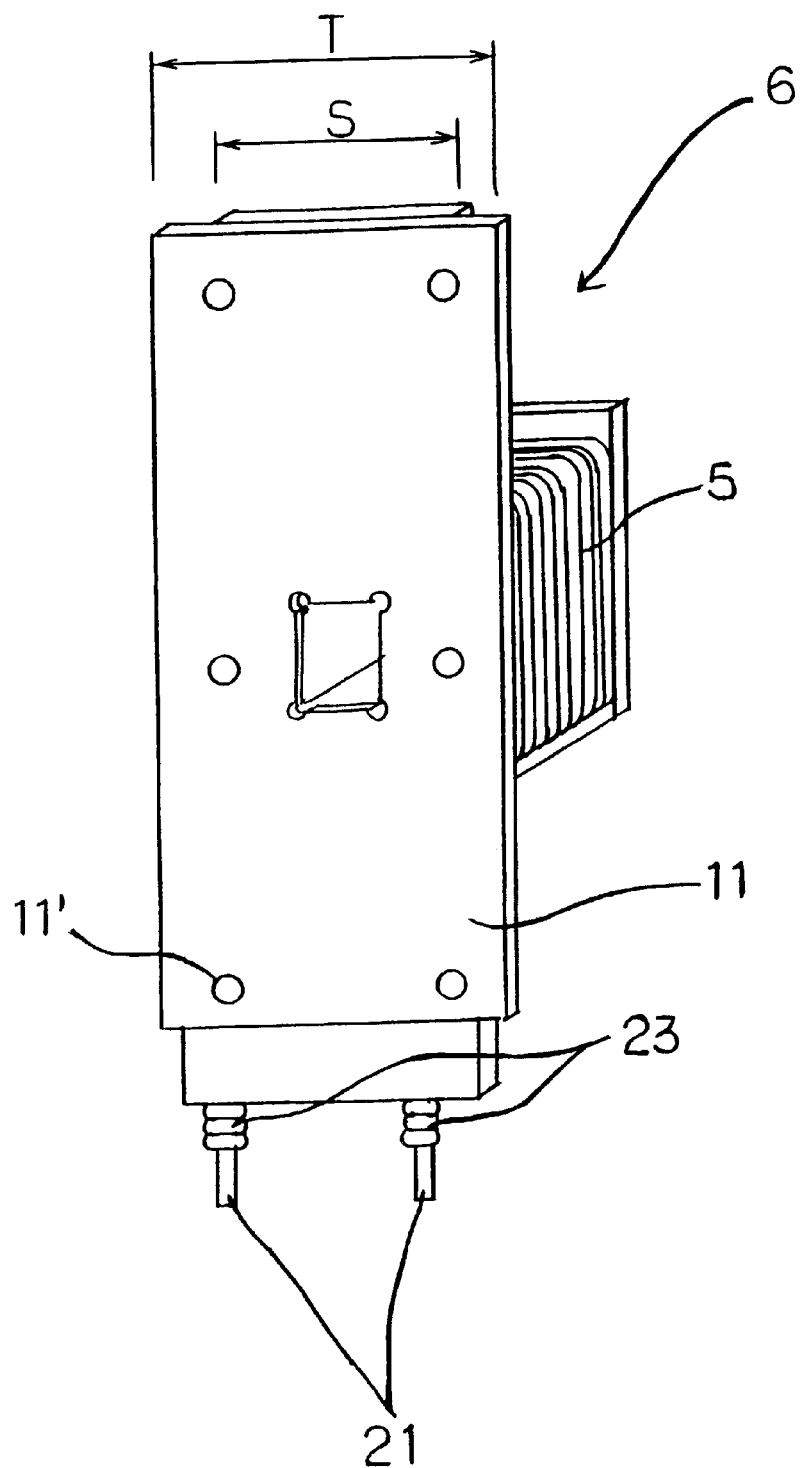
FIG. 19 is a perspective view showing another embodiment of a coil assembly.
Figure 22:
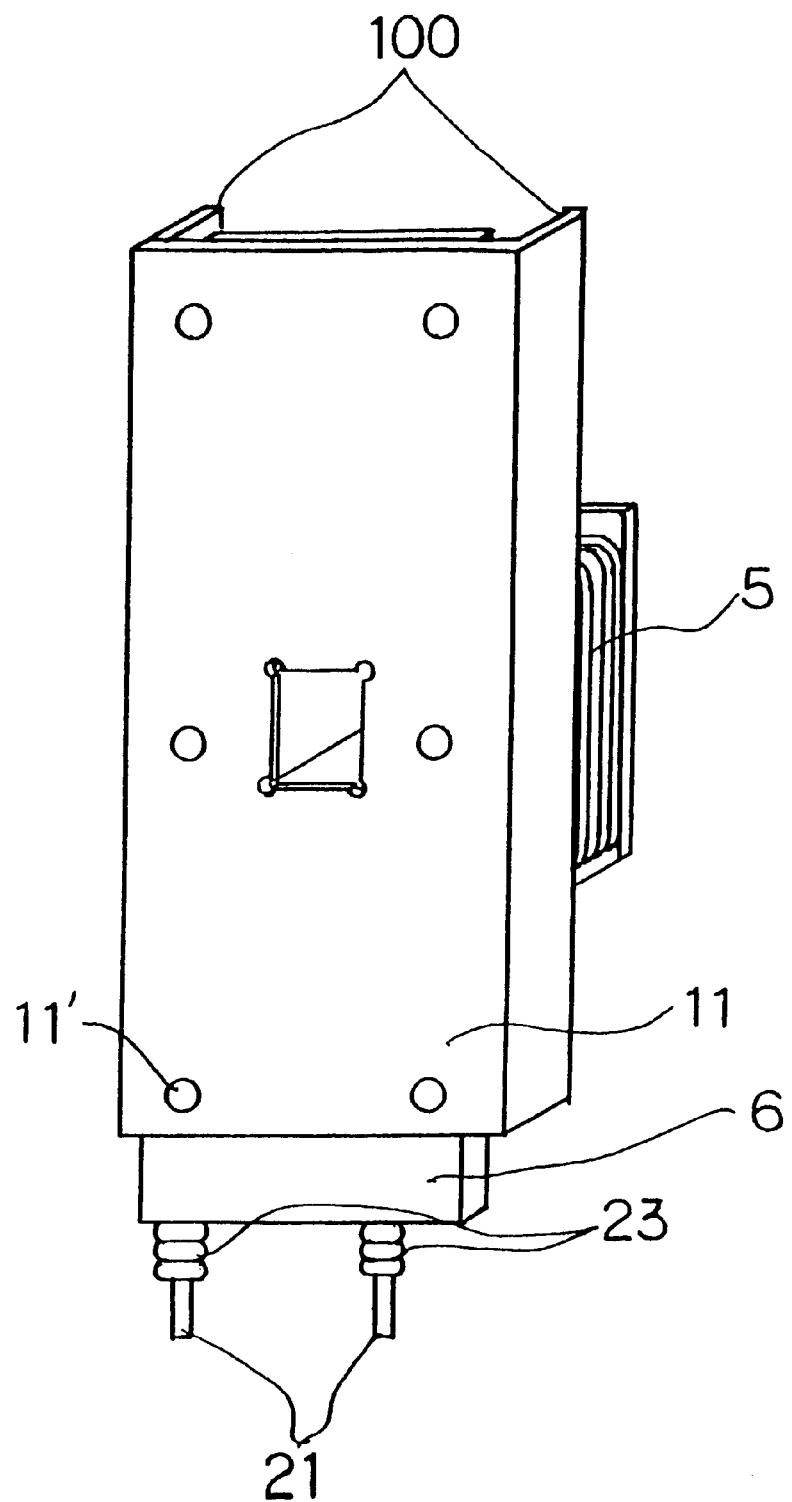
FIG. 22 is a perspective view showing a salient pole piece provided with a flange.

FIG. 19 is also a perspective view showing a coil assembly. The salient pole piece 11 shown therein is in a rectangular form and virtually equal to the coil assembly shown in FIG. 13. The difference lies in that there exists a relationship T>S between the width S of the bobbin and the width T of the salient pole piece 11. In the case of an inner rotor type, as described above, the coil assembly as a complete assembly cannot be put on the salient pole portion unless there exists the condition S<T<C, but when the condition C<T exists in the form of a salient pole piece 11 provided with skew, the coil assembly may first be mounted on the salient pole portion 20 and, then, the salient pole piece 11 may be fixedly put on the salient pole portion 20, which will be described later. FIG. 22 is a perspective view of the salient pole piece 11 shown in FIG. 19 provided with reinforcement ribs 100 along the longitudinal (axial) direction of the salient pole piece 11. In the motor structure according to the invention, the salient pole piece 11 generally has a rectangular shape elongated in the axial direction. Therefore, the rigidity of the salient pole piece 11 including the bobbin relative to the longitudinal direction (axial direction) is lowered and, sometimes, it is deformed by the magnetic attraction of the rotor magnet 2 and, in the worst case, such a difficulty occurs that the salient pole piece 11 comes into contact with the rotor magnet. When it is attempted to obviate such a difficulty, it may become necessary to make the air gap larger allowing for the deformation, but this is not preferable in view of the deterioration in the motor performance. Accordingly, it becomes very effective to provide the salient pole piece 11 with the ribs 100 to increase its rigidity as shown in FIG. 22.

When there exists the condition T>C>S, the mounting of the salient pole piece 11 can be achieved first by putting the coil assembly on the salient pole portion and then fixedly putting the salient pole piece 11 on the front end of the salient pole portion. In such case, as an example, the salient pole piece 11 of a structure as shown in FIG. 11 will first be put on the salient pole portion 20 and, then, the salient pole piece 11 will be fixed thereon by such means as hot caulking of projections formed on the collar portion of the bobbin. Referring to FIG. 22, the hot caulked portions are denoted by 11'.

Figure 20:
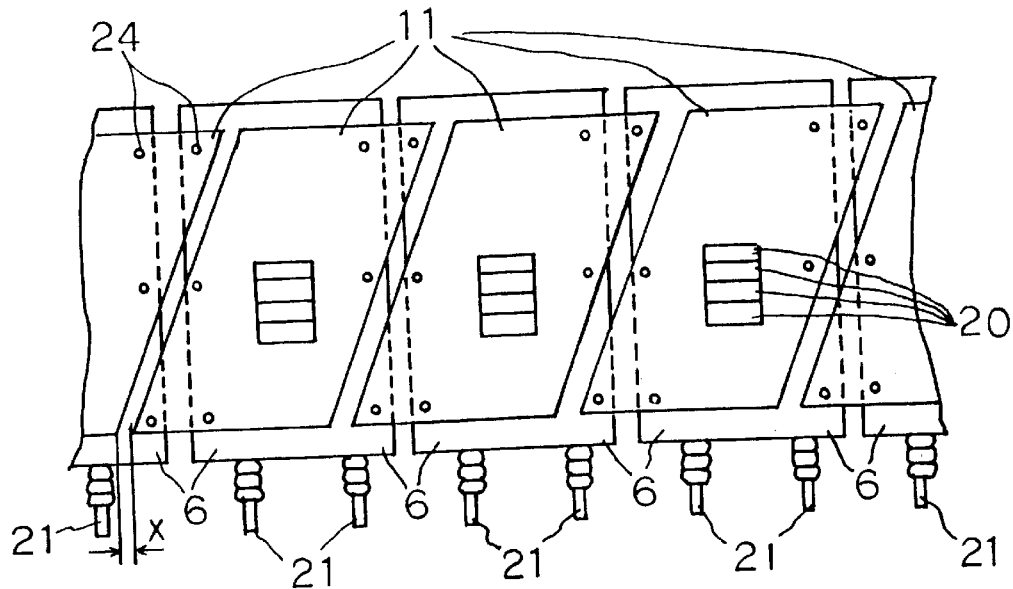
FIG. 20 is a development showing a state of a plurality of salient pole pieces provided with skew arranged side by side.

FIG. 20 shows an embodiment using a combination of the features of those shown in FIG. 16 and FIG. 18. The embodiment is characterized by that the gap X between adjoining salient pole pieces 11 shown in FIG. 22 can be made narrower as compared with that shown in FIG. 16.

Incidentally, when the gap X between the adjoining salient pole pieces 11 is made too narrow, the magnetic flux leaks out to the adjoining salient pole piece 11 and invites deterioration of the motor performance. Accordingly, it is preferred that the gap X be set at two to five times as large as the air gap. Of course, the skew may be provided as shown in the drawing or may not be provided. When skew is not provided, the shape of the salient pole piece 11 may be changed from a parallelogram to a rectangle.

Figure 21:
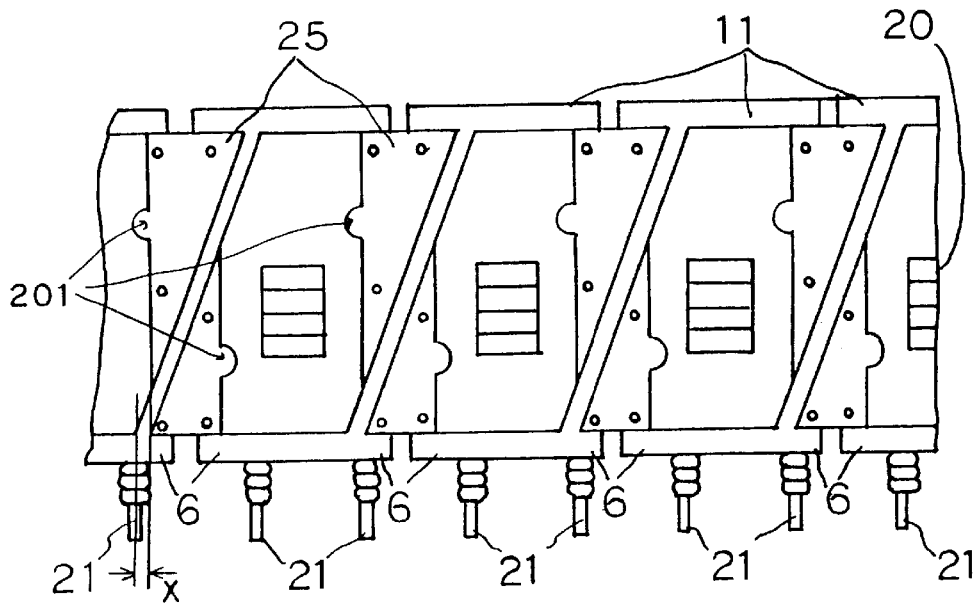
FIG. 21 is a development showing an example where auxiliary salient pole pieces are provided.

The one shown in FIG. 21 is the same as that shown in FIG. 20 in view of its function. However, it is characterized by that it is divided into three parts so that the salient pole piece 11 as assembled into a coil assembly can be mounted. That is, the salient pole piece 11 of FIG. 20 is formed equivalently of the structure of the entire yoke as shown in FIG. 17 and two triangular auxiliary salient pole pieces 25 (the shadowed portions in FIG. 21). By the division, it becomes possible first to complete the insertion of the coil assembly and then to dispose the two auxiliary salient pole pieces 25 astride the collar portions of two adjoining bobbins. Denoted by 201 shows a portion where the salient pole piece 11 and the auxiliary salient pole piece 25 are engaged with each other. Further, the auxiliary salient pole piece 25 disposed astride the collar portions of two bobbins is fixed on the bobbin collar portions by such means as hot caulking of projections 31 formed on the bobbin collar portions.

Figure 23:
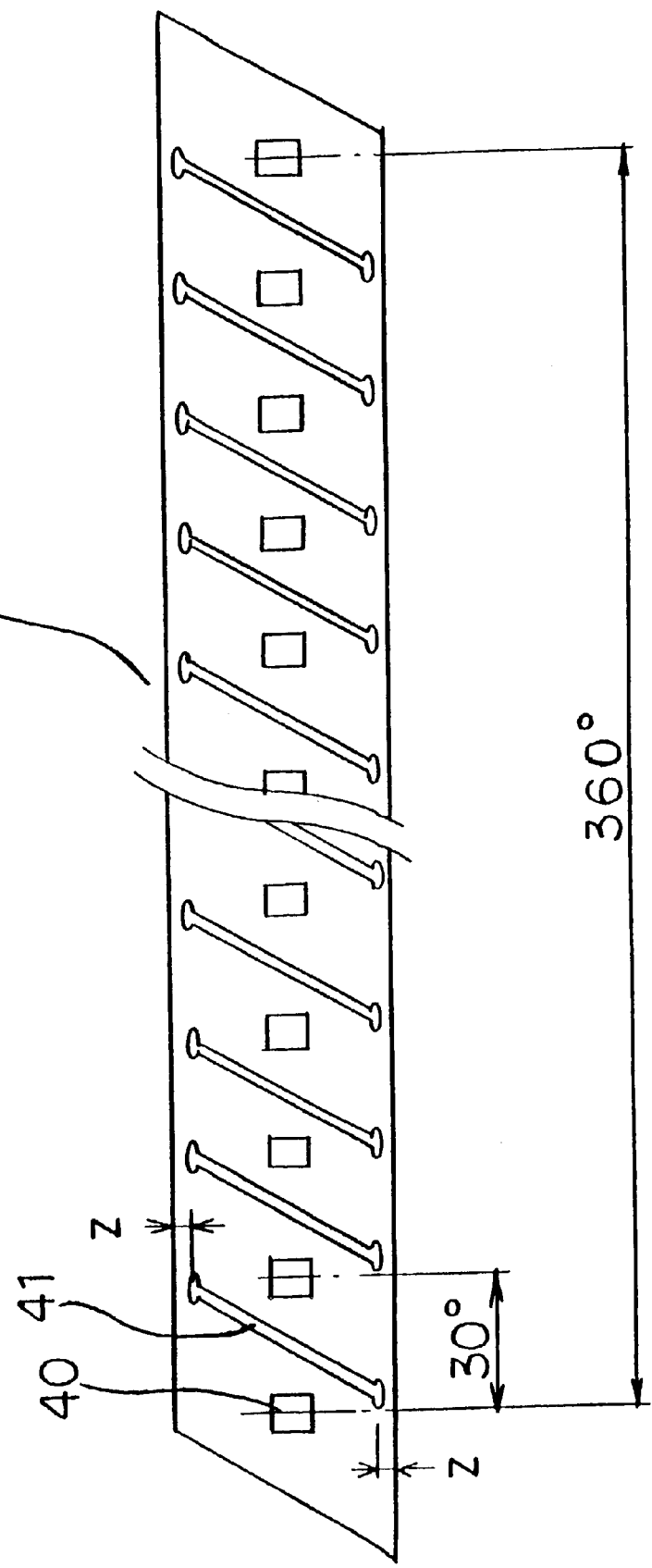
FIG. 23 is a development showing a state where a plurality of salient pole pieces are formed in one plate.

FIG. 23 shows another embodiment of the salient pole piece 11. The salient pole piece 11 shown in FIG. 23 is such that has a plurality (corresponding to the number of the motor salient poles) of square holes 40 for inserting the salient pole portions therein and magnetic grooves 41 for adjusting permeance alternately disposed on a belt-shaped plate. The present embodiment is that having 12 salient poles the same as the first embodiment shown in FIG. 1. Since it is for 360 degrees, one single plate is enough for each motor. According to convenience of working, the belt-shaped salient pole piece 11 may be divided into two pieces. Further, it is better to make the distance Z (refer to FIG. 23) between the end of the permeance adjusting groove and the edge of the salient pole piece as small as possible in view of the magnetic characteristics. However, under constraint of machining workability, it is preferred that the distance be set at around two times as large as the air gap (at 0.5–1.0 mm) when the plate thickness is 0.5 mm or so. Only by forming the belt-shaped salient pole piece 11 into a cylindrical shape after insertion of the coil assemblies therein and putting the same on the salient pole portions 20 in succession, the mounting of the salient pole piece 11 can be completed.

Figure 24:
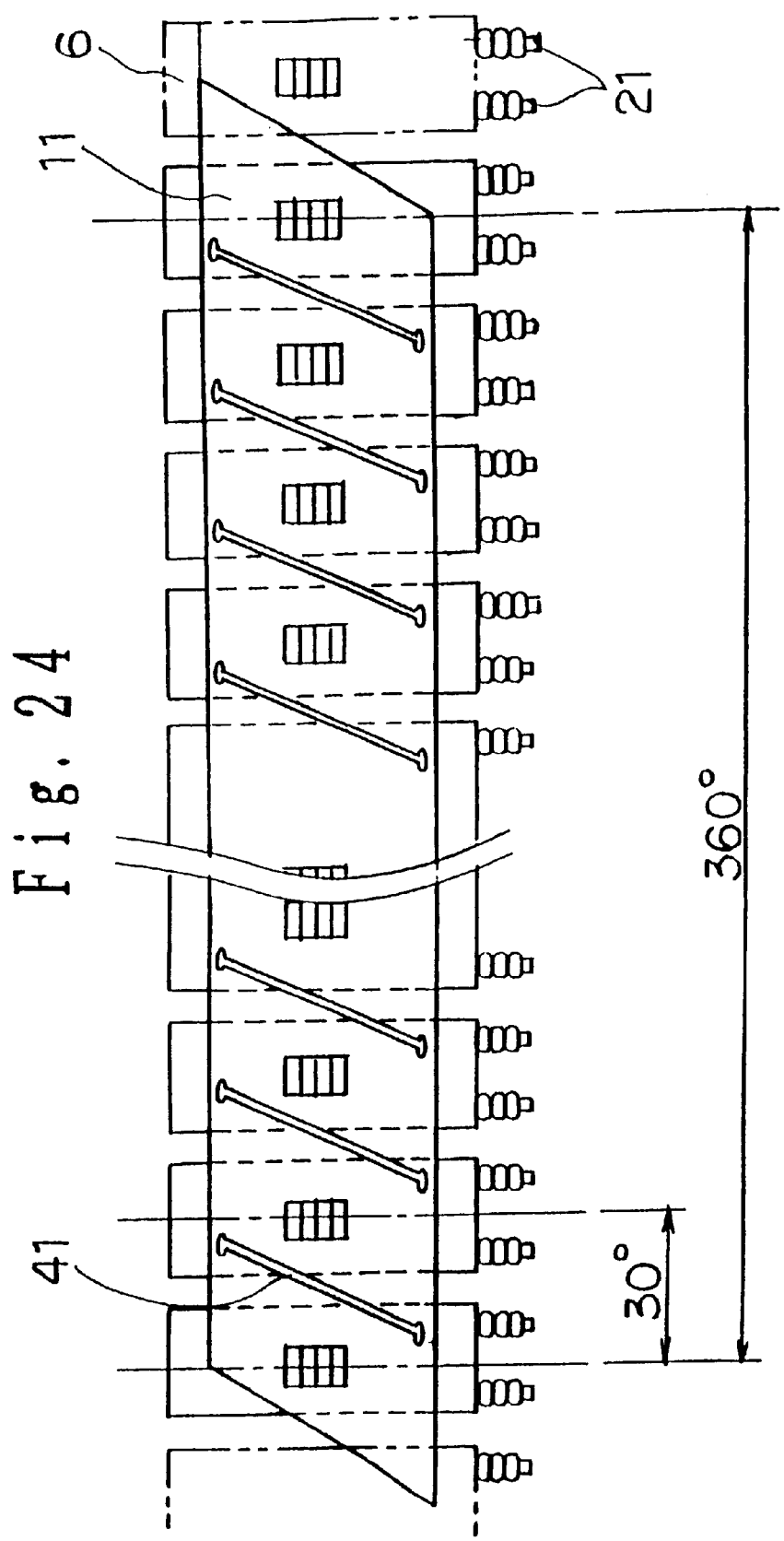
FIG. 24 is a development showing a state of actually mounted salient pole pieces of FIG. 23.

FIG. 24 shows a development of the salient pole piece 11 gone through with the mounting. By employing such a salient pole piece 11, the workability is greatly improved over that when mounting the salient pole pieces 11 on individual salient pole portions 20 one by one. When the permeance in the connecting portion becomes a problem (because of the dimension Z in FIG. 23 being large), the connecting portions may be cut off to magnetically separate both sides thereof after the mounting has been completed.

Figure 25:
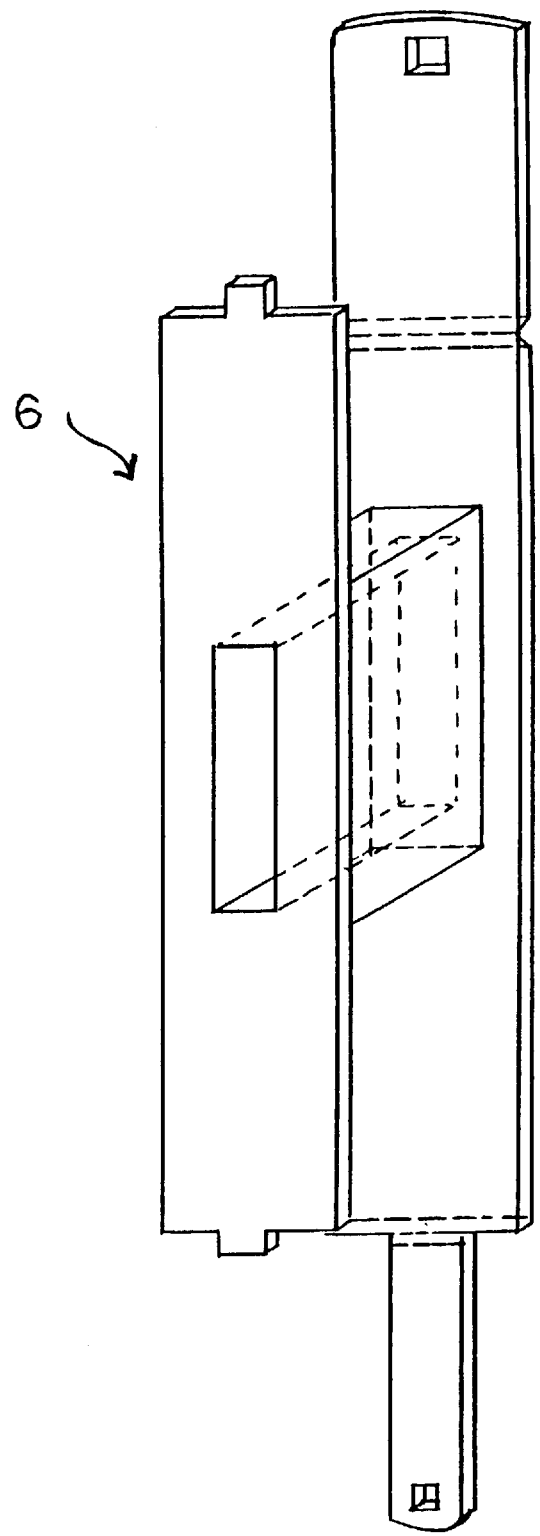
FIG. 25 is a perspective view showing a bobbin of another type.
Figure 26:
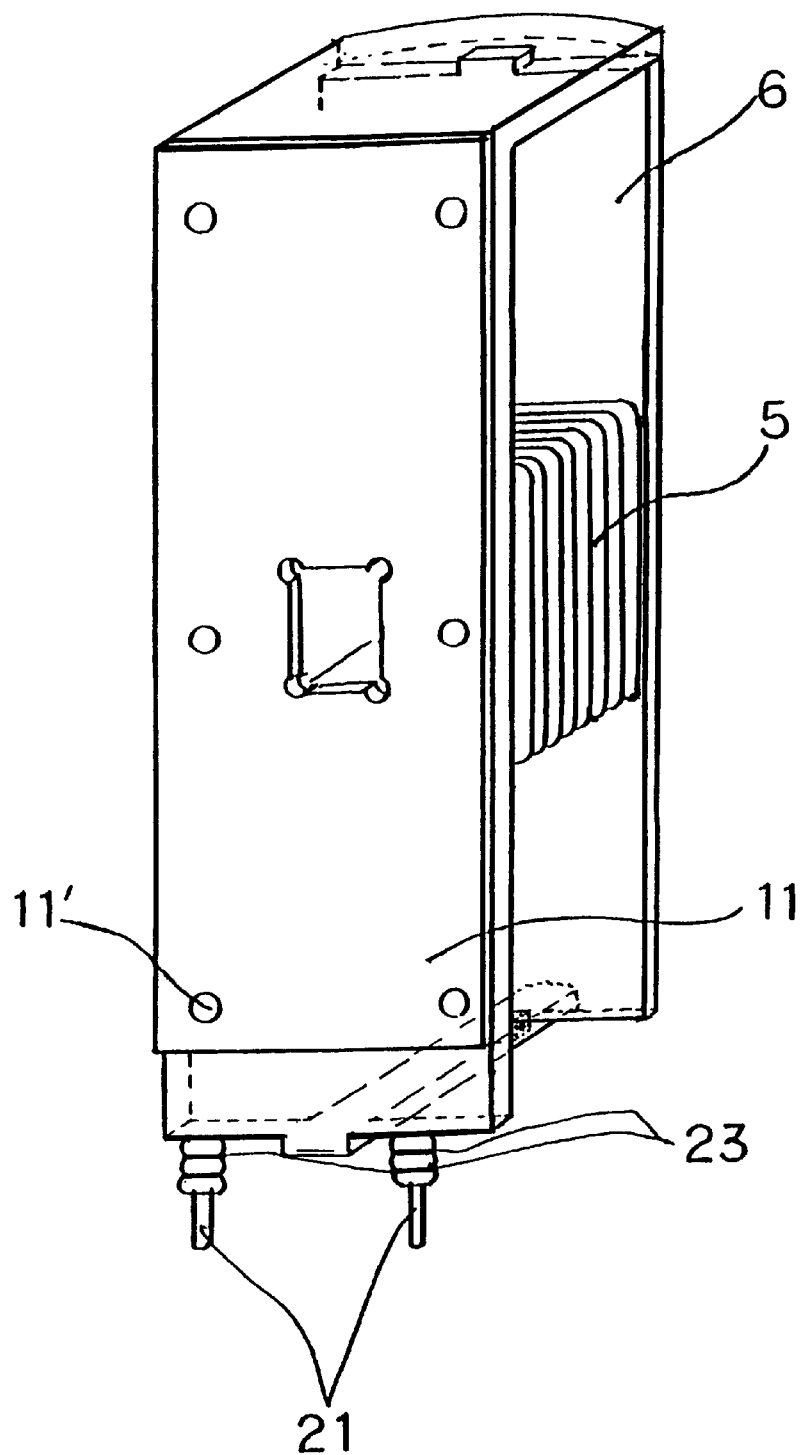
FIG. 26 is a perspective view showing a bobbin of yet another type.

FIG. 25 and FIG. 26 are drawings explanatory of a structure devised for improving the mechanical strength (rigidity) of the bobbin. Though the problem of the salient pole piece 11 attracted by the rotor magnet 2 was described with reference to FIG. 22, the countermeasures taken for the bobbin 6 will be described with reference to FIG. 25 and FIG. 26. FIG. 25 shows reinforcement ribs extended, in the axial direction, from the collar portion of the bobbin 6 of FIG. 10 on the side where the salient pole piece 11 is disposed. The broken lines show grooves for bending the rib and the ribs are adapted to be bent there. The hole made in the rib that is bent is adapted to be fitted on the projection made at the bobbin collar portion on the side opposite to the salient pole piece 11. FIG. 26 shows a state of the assembly in which the winding of a coil 5 has been provided around the bobbin 6 of FIG. 25 and further the salient pole piece 11 has been bent at the grooves for bending. The front end of the rib is formed in a circular arc shape so that, when the assembly is mounted on the armature yoke 1, the circular arc is brought into contact with and fixed onto the inner circumferential face of the cylindrical portion of the armature yoke 1. By bending the ribs, the mechanical strength (rigidity) of the bobbin 6 can be greatly improved. As a result, the salient pole piece 11 fixed onto the bobbin collar portion can, even if the bobbin 6 is made of a resin material, have a strength standing the attraction of the rotor magnet 2. Incidentally, the form of the reinforcement rib is not limited to that described above but it may be such that disposed in the circumferential direction.

Figure 27:
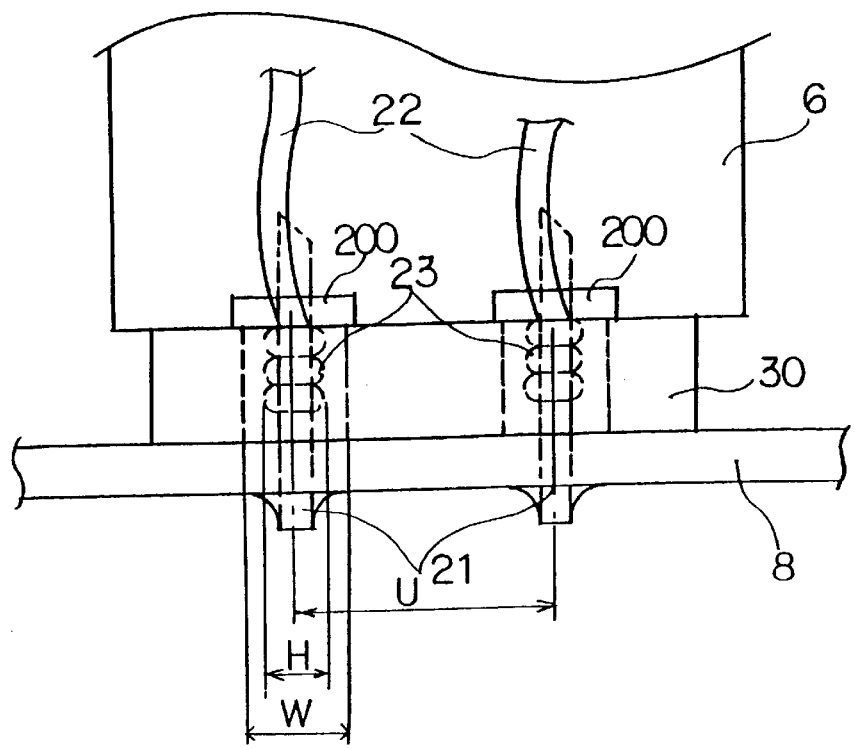
FIG. 27 is a side view showing a state of an electromagnetic noise absorbing core mounted on a coil.
Figure 28:
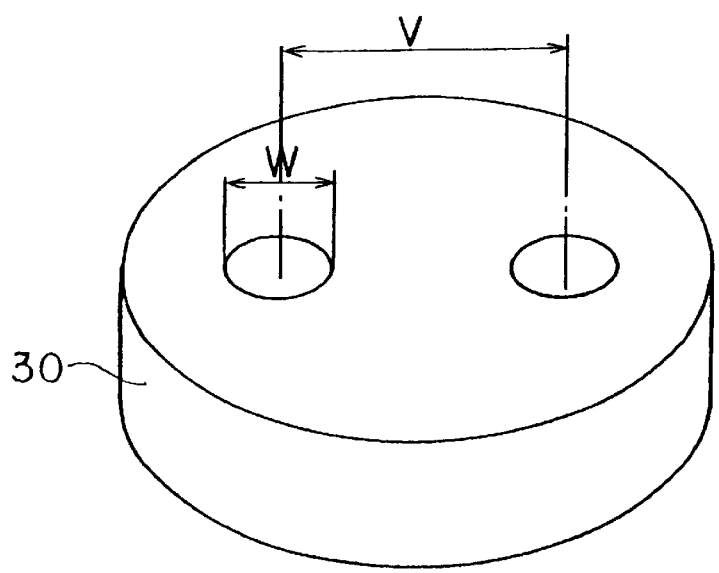
FIG. 28 is a perspective view showing an electromagnetic noise absorbing core.

FIG. 27 is a drawing showing a state of a core 30 formed of a soft ferrite material and having holes made therein, as shown in FIG. 28, put on the pins of the bobbin 6. It is aimed to reduce generation of electromagnetic noise by the electromagnetic interlinkage of the core 30 with the coil current.

Referring to FIG. 27, the core 30 formed of a soft ferrite material, also serving as the spacer between the bobbin 6 and the connection board 8, has two holes made therein, the hole-to-hole pitch being set according to the following condition:

$$H < W, \text{ and}$$

$$U \approx V,$$

where H is the maximum diameter of the deposit-soldered portion, W is the diameter of the hole in the core 30, U is the pitch between the pins to be inserted into the bobbin, and V is the pitch between the holes in the core 30. Referring to FIG. 27, 200 denotes a groove through which the coil end 22 is passed when the core 30 put on a pin 21.

Figure 29:
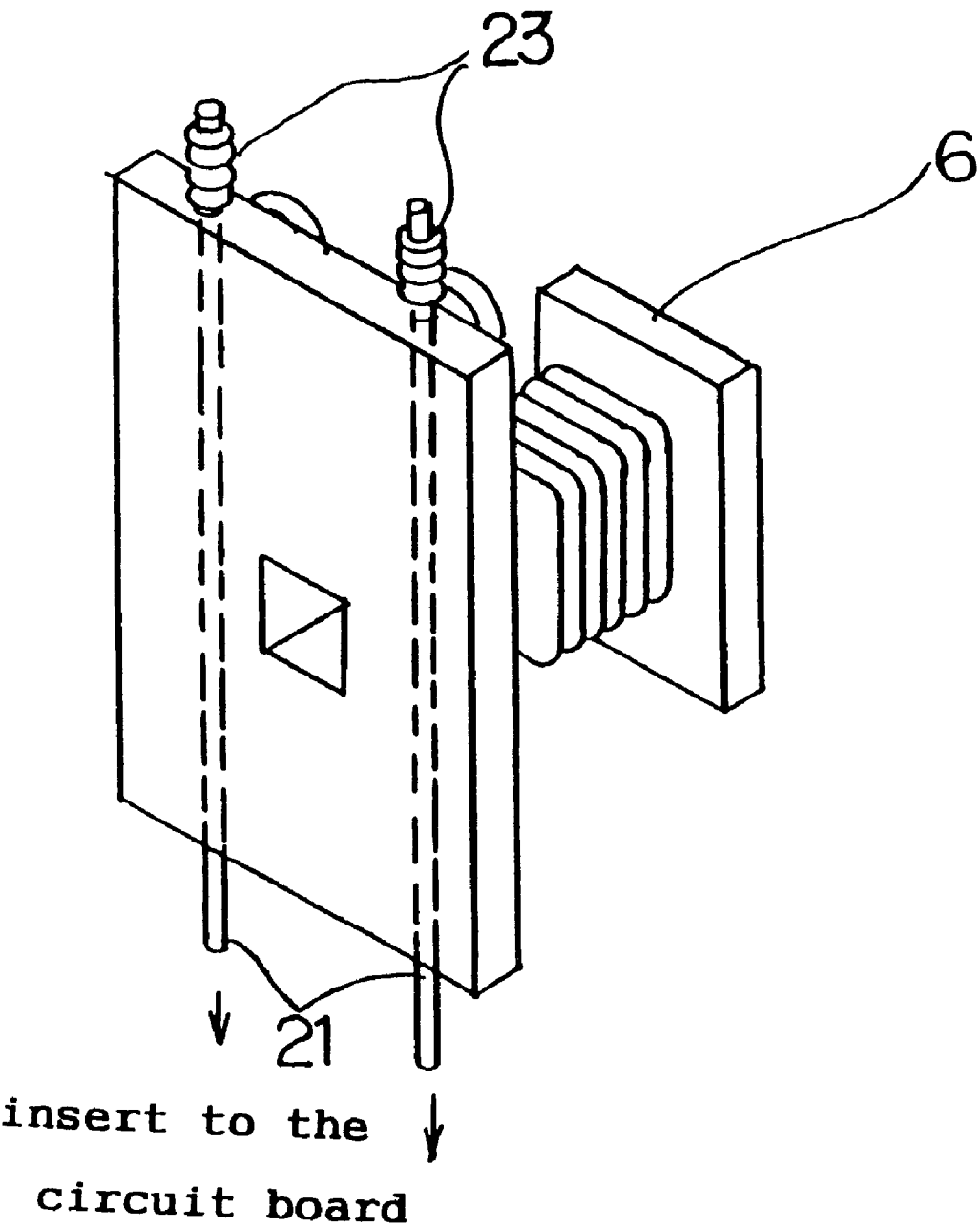
FIG. 29 is a perspective view showing a structure for absorbing electromagnetic noise.

FIG. 29 is a perspective view showing another embodiment. In order to improve the capability of suppressing electromagnetic noise, it is advantageous to elongate the core of a soft magnetic material interlinking with the current. According as the core is longer, its noise suppressing effect becomes higher. The embodiment of FIG. 29 is such that makes use of that principle. In brief, to provide a noise suppressing core, the whole of the collar portion of the bobbin 6 is made of a resin containing a soft magnetic material. Namely, by having the portion of the pins 21 of the bobbin around which the coil is wrapped and the portion thereof connected with the connection board 8 arranged on the opposite sides, the collar of the bobbin 6 in the longitudinal direction is utilized so as to directly interlink with the current flowing through the coil. Of course, at this time, the collar portion of the bobbin 6 must be formed of a resin containing powder of soft ferrite. By having not only the collar portion, but also the whole of the bobbin, formed of a resin containing magnetic powder of soft ferrite or the like, the motor performance can be improved, while the effect of suppressing the electromagnetic noise is obtained by the effect as described above.

Figure 30:
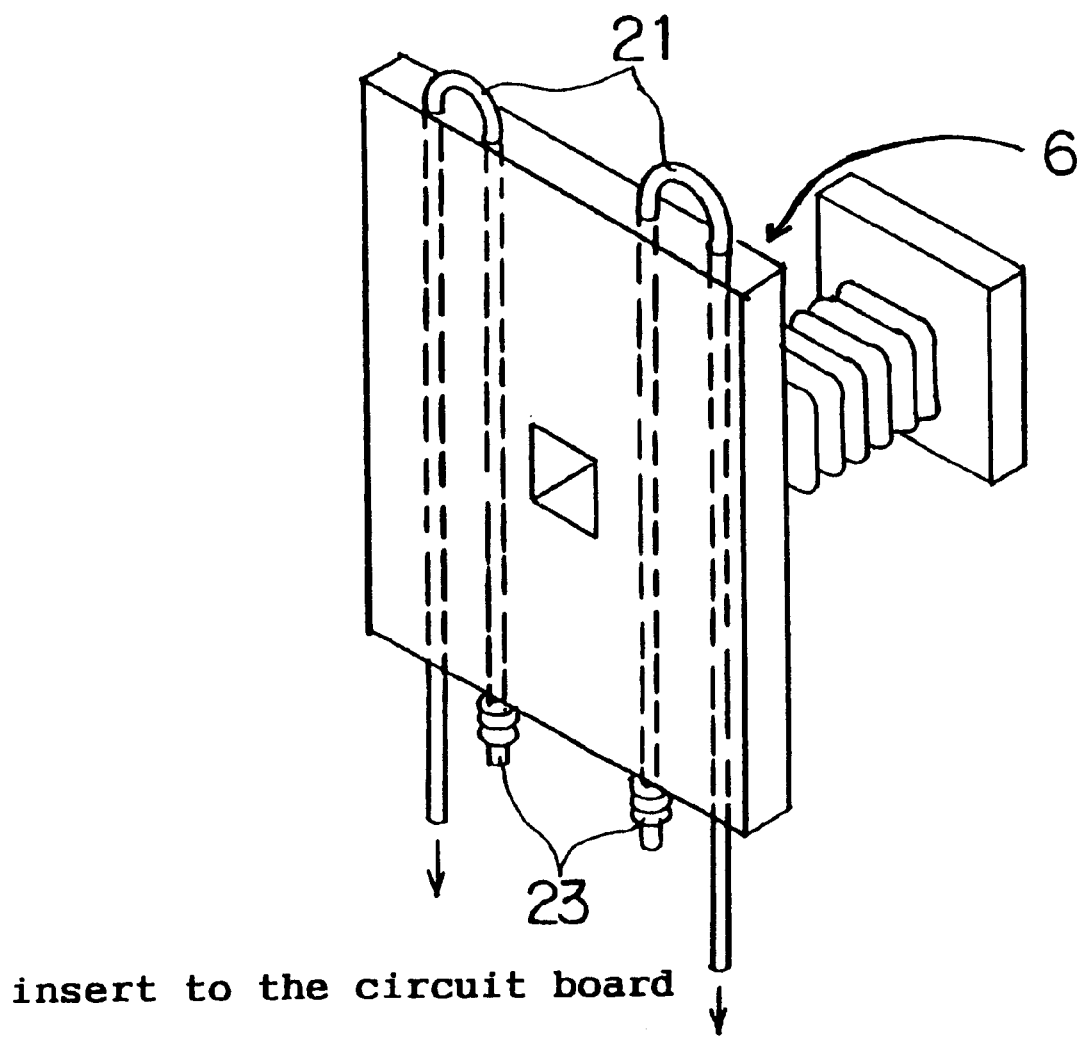
FIG. 30 is a perspective view showing another structure for absorbing electromagnetic noise.

FIG. 30 is a perspective view showing another embodiment in which the noise suppressing effect of the embodiment of FIG. 29 is enhanced. The embodiment shown in FIG. 30 is the same as that shown in FIG. 29 in that it makes use of the collar portion of the bobbin 6, but in the embodiment of FIG. 30, the pin 20 leading to the terminal 23 is bent in a "U" shape and the portion around which the coil is wrapped and the portion connected with the connection board 8 are arranged on the same side.

By making such arrangement, the length of the core interlinking electromagnetically with the coil current can be redoubled. Of course, the noise suppressing effect can further be enhanced if, in addition to the embodiments of FIGS. 27, 29, and 30, noise absorbing parts (such as a capacitor and a varistor) are electrically connected with both ends of the coil on the connection board 8. Further, when the allowable level of occurring electromagnetic noise is high, the number of the cores to be mounted may be decreased by mounting the cores not on all the bobbins, but on alternate bobbins, or mounting one core for each phase.

Figure 31:
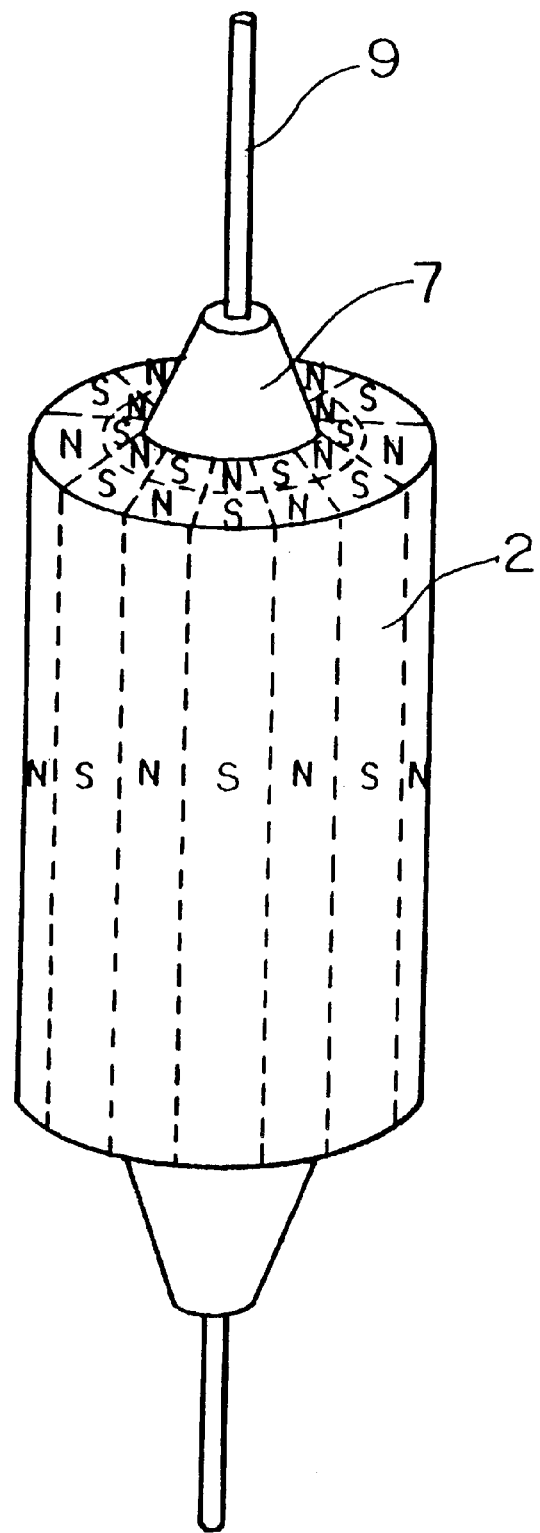
FIG. 31 is a perspective view of a rotor magnet.
Figure 33:
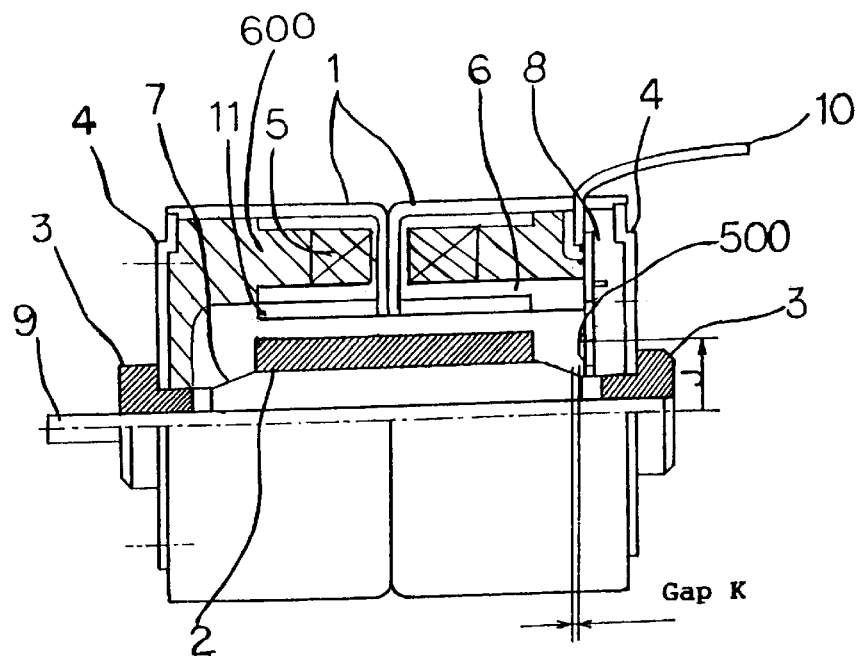
FIG. 33 is a side view showing a state of an armature yoke and a coil assembly integrally put into a molding, in which a speed detector is disposed close to a connection board.

Finally, a motor structure incorporating a speed detector and having the armature yoke and the coil assembly integrally put into a molding of a resin of a polymeric material will be described. FIG. 33 is a half sectional diagram of the same. Since this embodiment is the same as that shown in FIG. 1 except for the speed detector portion, and like parts are denoted by like reference numerals, description of them will be omitted unless it is specifically needed. Reference numeral 2 denotes a rotor magnet and, on the end face thereof, there are magnetized 16 poles in the present embodiment as shown in FIG. 31 the same as the field magnet portion. Reference numeral 8 denotes a connection board which is made up of a board of a resin (insulator) material having electric circuits formed thereon of copper foil by etching or the like, and referring to FIG. 1, there are formed circuits for connecting the coils 5 and supplying power to the coils 5. Reference numeral 500 denotes an electromagnetic converting element (such as a Hall element or an electric resistance element) disposed a small distance K (K is 0.1 mm–1.0 mm) apart from the end face of the rotor magnet 2 and fixed onto the connection board 8 by soldering or the like. The converting element is provided with necessary circuits. By the described arrangement, a speed detector capable of non-contact detection can be constructed. The radius J of the electromagnetic converting element 500 with respect to the center of rotation of the rotor magnet 2 (denoted by O in FIG. 34) is set to be smaller than the outer radius of the rotor magnet 2. It is preferred that the end of the radius J be positioned around the midway through the thickness of the rotor magnet 2.

Reference numeral 600 denotes a resin molding. Since the armature yoke 1 and the coil assembly 6' are integrated with each other by the resin molding, accuracy of parts can be secured and handling of them facilitated.

Figure 34:
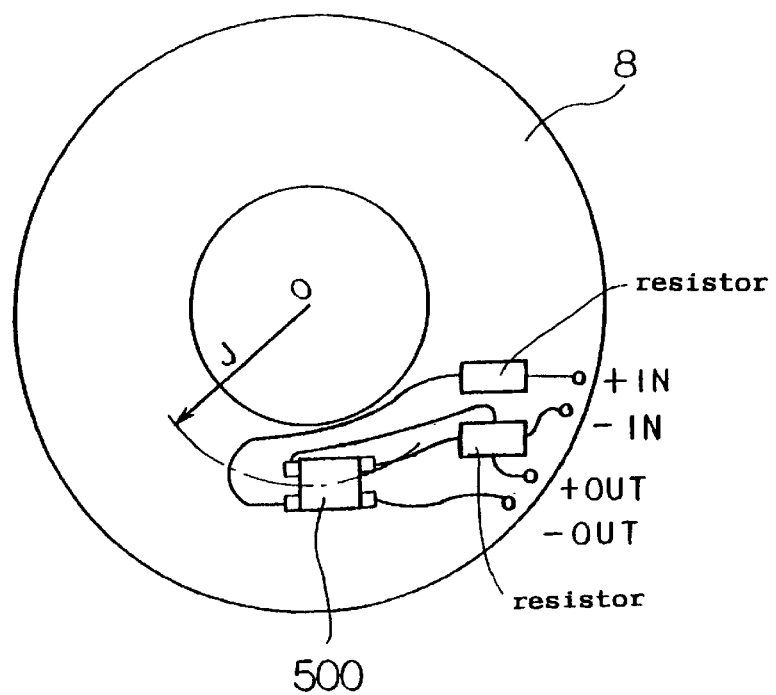
FIG. 34 is a front view showing a connection board on which an electromagnetic converting element is mounted.

FIG. 34 is a plan view showing an example of a circuit pattern with the electromagnetic converting element 500 disposed on the connection board 8, though there are not shown the circuit patterns for connecting the coils 5 and supplying power to the coils 5. The circuits supply power to the electromagnetic converting element 500 through two resistors. In the power supply, in the present embodiment, the plus voltage side of DC power is connected to the terminal +IN and the minus voltage side is connected to the terminal –IN. Further, the output of the speed detector (which, in the present embodiment, has a resolving power of 8 PPR) is taken out from the terminals +OUT and –OUT).

The arrangement of the speed detector is not limited to that described above. It may be practiced to have only a portion of the end face of the rotor magnet 2 protruded (a portion, for example, corresponding to one pair of N/S poles) and to allow a large electric power to be generated by the electromagnetic converting element 500 each time the protrusion comes into confrontation with the same. Of course, it is also possible to form a coil on the connection board 8 by etching, instead of disposing the electromagnetic converting element thereon, and take out an electric output signal from the coil, i.e., to form the so-called FG (Frequency Generator) on the board.

Having described the invention as related to the above embodiments, it is apparent that various variations or applications are possible within the scope of the spirit of the present invention and these variations or applications are not to be excluded from the scope of the present invention.

According to the present invention, even in a radial gap type cylindrical motor, the sectional form characteristic coefficient can be made as small as that in the prior art flat, outer rotor type DC brushless motor constructed by laminating a plurality of stators. Therefore, the flux density in the salient pole portion can be adjusted and, thereby, the resistance value of the coil winding provided around the salient pole portion can be lowered. Accordingly, only necessary minimum material is required and thus a light weighing motor with improved efficiency can be provided.

According to the invention set forth in claim 2 and claim 4, the structure allows a coil winding to be provided on a bobbin and, therefore, the efficiency in the winding and assembling work can be greatly improved.

According to the invention set forth in claim 5, spatial distribution of flux density can be adjusted by the form of the salient pole piece disposed at the front end of the salient pole portion and , therefore, cogging/torque ripple can be improved (reduced).

In the motor structure according to the invention, the salient pole piece generally has a rectangular form elongated in the axial direction. Therefore, the salient pole piece, including the bobbin, becomes lowered in rigidity relative to the longitudinal direction (the axial direction) and sometimes it is deformed by the magnetic attraction of the rotor magnet acting thereon. In the worst case, such a difficulty occurs that the salient pole piece comes into contact with the rotor magnet. To obviate such a difficulty, it becomes necessary to make the air gap larger allowing for the deformation of the salient pole piece. This, however, is not preferable in view of the motor performance. Accordingly, according to the invention set forth in claim 6, the salient pole piece is provided with a rib for improving the rigidity of the salient pole piece. This is a very effective countermeasure for the reinforcement.

According to the invention set forth in claim 7, a salient pole piece astride three coil assemblies is formed equivalently of a yoke structure and two triangular auxiliary salient pole pieces and assembling work can be done with such a structure. Thus, such functions of the salient pole piece as reducing the amount of cogging can be easily performed.

According to the invention set forth in claim 8, since a plurality of salient pole pieces are punched out from a plate, it is suited for mass production of the motor structures.

According to the invention set forth in claim 9 and 10, eddy current loss can be reduced by means of grooves or slits formed in the salient pole piece and, thereby, the motor efficiency can be improved.

According to the invention set forth in claim 11, skew is provided for a salient pole piece and, thereby, a motor structure producing only a small amount of cogging and being excellent in the starting characteristic can be obtained.

According to the invention set forth in claims 12 and 13, since the armature yoke includes a cylindrical portion, salient poles can be projected from the edge portion of the armature yoke either inwardly or outwardly and, hence, the armature yoke according to the invention can be applied not only to the inner rotor type structure but also to the outer rotor type structure. Further, according to the invention set forth in claim 14, since the armature yoke includes a cylindrical portion, a flange holding a bearing can be fixed on the edge portion of the cylindrical portion without the need for providing a special fixing structure.

According to the invention set forth in claim 15, a flux density adjusting yoke can be interposed between the salient poles. Therefore, magnetic saturation is prevented from occurring and the motor can be operated smoothly.

According to the invention set forth in claim 16, each bobbin is provided with an electromagnetic noise suppressing coil disposed/fixed so as to magnetically interlink with the coil current. Therefore, electromagnetic noise to be produced at the time of coil commutation can be greatly reduced.

According to the invention set forth in claim 17, wirings necessary for the coils can be provided on the circuit board and a speed detector can also be incorporated in the circuit board. Therefore, a compact motor structure can be provided.

According to the invention set forth in claim 18, a coil assembly having a coil winding provided on a bobbin is first put on a salient pole portion and then a salient pole piece for converging magnetic flux on the salient pole front end portion is disposed at the bobbin collar portion. Therefore, assembling of the stator which otherwise is complicated can be simply carried out.

According to the invention set forth in claim 19, a bobbin is provided with grooves or slits for bending at its collar portion, and after the bobbin with a coil winding provided thereon has been put on a salient pole portion, the collar portion is bent along the grooved or slitted portion so that a lib is formed. Therefore, the rigidity of the bobbin can be improved and, further, assembling of the stator which otherwise is complicated can be simply carried out.

According to the invention set forth in claim 20, a stator coil assembly and a salient pole piece are set in place and thereafter they are integrally put into a molding of a resin of a polymeric material. Therefore, dimensional accuracy of the assembly can be stabilized and handling of the same becomes easy. Thus, reliability and assembling efficiency can be improved.

What is claimed is:

1. A radial gap type cylindrical motor comprising:
   first and second armature yokes each including a cylindrical portion and a plurality of salient poles formed in a radial direction on a circumference of one end of the cylindrical portion;
   a plurality of salient pole portions each formed by adjoining one of the salient poles of the first armature yoke with a respective one of the salient poles of the second armature yoke;
   a salient pole piece formed on top of each salient pole portion, each salient pole piece opposing a rotor magnet rotatably disposed in the motor; and
   a concentrated winding coil wound around each of said salient pole portions.

2. A radial gap type cylindrical motor according to claim 1, wherein each of said concentrated winding coils is wound with bobbin and forms a coil assembly having said pole piece in a path of magnetic flux.

3. A radial gap type cylindrical motor according to claim 1, wherein each of said pole pieces is formed in a rectangle and a breadth thereof is larger than that of a collar of said coil assembly.

4. A radial gap type cylindrical motor according to claim 1, wherein each of said pole pieces has a reinforced rib along a longitudinal direction of said respective salient pole.

5. A radial gap type cylindrical motor according to claim 1, wherein each of said bobbins has an auxiliary salient pole piece across a collar of the bobbin.

6. A radial gap type cylindrical motor according to claim 1, wherein each of said salient pole pieces is connected with a belt-shaped plate and has a square hole inserting the respective salient pole portion therein and a magnetic groove adjusting permeance.

7. A radial gap type cylindrical motor according to claim 1, wherein each of said salient pole pieces has a groove preventing an eddy current loss.

8. A radial gap type cylindrical motor according to claim 1, wherein each of said salient pole pieces has a slit in a longitudinal direction of said respective salient pole preventing an eddy current loss.

9. A radial gap type cylindrical motor according to claim 1, wherein sides of each of said salient pole pieces are formed askew.

10. A radial gap type cylindrical motor according to claim 1, wherein each of said salient poles is formed outside the respective cylindrical portion.

11. A radial gap type cylindrical motor according to claim 1, further comprising a flux density adjusting yoke inserted between said first and second armature yokes.

12. A radial gap type cylindrical motor according to claim 1, wherein a terminal of each of said coil assemblies has a core reducing electromagnetic noise by an electromagnetic interlinkage of the core with an electromagnetic interlinkage of the core with a coil current.

13. A radial gap type cylindrical motor according to claim 1, further comprising a rotor magnet, wherein a terminal of each of said coil assemblies is connected to a circuit board connected to the coil and the circuit board has a speed detector interlinking a magnetic flux of the rotor magnet.

14. A radial gap type cylindrical motor according to claim 1, wherein said armature yokes and said coil assemblies are each molded unitedly from high polymerized component.

15. The radial gap type cylindrical motor according to claim 3, wherein said salient pole portions each have the same cross sectional shape.

16. A method for assembling first and second sets of salient poles for a radial gap type cylindrical motor, comprising:
    forming a plurality of salient pole portions by adjoining each of the first set of salient poles with a corresponding one of the second set of salient poles;
    winding a concentrated winding coil around each of said salient pole portions forming a plurality of coil assemblies, each having a collar;
    forming a salient pole piece on top of each salient pole portion, wherein each salient pole piece opposes a rotor magnet rotatably disposed in the motor; and
    affixing each salient pole piece on top of the respective salient pole on the collar of the respective coil assembly after inserting the coil assemblies in the respective salient pole portions.

17. A method claimed in claim 16, further comprising:
    bending a slit in each of the collars; and
    forming a build up part to each of the coil assemblies by bending the collar of each of the coil assemblies.

18. A radial gap type cylindrical motor having a stator including at least one armature yoke made of a soft magnetic material and projecting a plurality of salient poles radially from a circumference of each of said armature yokes and two flanges having bearings respectively disposed on first and second sides of each of said armature yokes and stator coils wound on each of said salient poles, and a rotor including a cylindrical permanent magnet disposed rotatably on the bearings, wherein:
    said at least one armature yoke includes first and second armature yokes each including a cylindrical portion and a plurality of salient poles formed in a radial direction on a circumference of a first end of the cylindrical portion;
    a respective one of said stator coils is wound with a concentrated winding on a bobbin having a collar inserted into salient pole portions, each formed by adjoining each of said salient poles of the first armature yoke with a respective one of the salient poles of the second armature yoke, forming a plurality of stator coil assemblies; and
    salient pole pieces are formed in a rectangle and separately fixed on top of each salient pole portion, each salient pole piece opposing a rotor magnet rotatably disposed in the motor concentrating magnetic flux.

19. A radial gap type cylindrical motor according to claim 18, wherein each of said salient pole pieces is formed in a rectangle and a breadth thereof is larger than that of a collar of said coil assembly.

20. A radial gap type cylindrical motor according to claim 18, wherein said salient pole pieces are inseparably fixed to the collar of said bobbin.

21. A radial gap type cylindrical motor according to claim 18, wherein said salient pole piece has a reinforced rib along a longitudinal direction of said salient pole.

22. A radial gap type cylindrical motor according to claim 18, wherein said bobbin has an auxiliary salient pole piece across the collar of the bobbin.

23. A radial gap type cylindrical motor according to claim 18, wherein said salient pole pieces are connected with a belt-shaped plate, each salient pole piece having a square hole to insert the salient pole portion therein and a magnetic groove to adjust magnetic permeance.

24. A radial gap type cylindrical motor according to claim 18, wherein said salient pole piece has a groove for preventing an eddy current loss.

25. A radial gap type cylindrical motor according to claim 18, wherein said salient pole piece has a slit in a longitudinal direction of said respective salient pole preventing an eddy current loss.

26. A radial gap type cylindrical motor according to claim 18, wherein sides of each of said salient pole pieces are formed askew.

27. A radial gap type cylindrical motor according to claim 18, wherein each of said salient poles is formed on an inside of the respective cylindrical portion.

28. A radial gap type cylindrical motor according to claim 18, wherein each of said salient poles is formed on an outside of the respective cylindrical portion.

29. A radial gap type cylindrical motor according to claim 18, wherein opening end portions of said first and second armature yokes have a flange fixing a bearing in a center of the flange.

30. A radial gap type cylindrical motor according to claim 18, further comprising a flux density adjusting yoke inserted between two said first and second armature yokes.

31. A radial gap type cylindrical motor according to claim 18, wherein a terminal of each of said coil assemblies has a core reducing common mode noise.

32. A radial gap type cylindrical motor according to claim 18, wherein a terminal circuit board is connected to said stator coil of each of said coil assemblies, has a circuit board which is loaded with a speed detector interlinked to the rotor magnet and outputs an electrical signal according to a variation of magnetic flux.

33. A method for assembling of said salient poles for a radial gap type cylindrical motor according to claim 18, comprising:

inserting a coil assembly wound with a coil into each of the salient pole portions; and fixing each of said salient pole pieces to a top of the respective salient poles on the collar of said respective coil assemblies after inserting each of said coil assemblies into the respective salient pole portion.

34. A method for reinforcement of the collar of said salient pole for a radial gap type cylindrical motor according to claim 18, comprising:

bending a slit in each collar of said coil assemblies; and forming a build-up part of said coil assembly by bending each of said collars of said coil assemblies.

35. A radial gap type cylindrical motor according to claim 18, wherein each of said armature yokes and said coil assemblies are molded unitedly from a high polymerized component.

36. A radial gap type cylindrical motor comprising:

first and second armature yokes each including a cylindrical portion and a plurality of salient poles formed in a radial direction on a circumference of one end of the cylindrical portion;

a plurality of salient pole portions each formed by adjoining one of the salient poles of the first armature yoke with a respective one of the salient poles of the second armature yoke;

a salient pole piece formed on top of each salient pole portion, each salient pole piece opposing a rotor magnet rotatably disposed in the motor; and a concentrated winding coil wound with bobbin around each of said salient pole portions forming respective coil assemblies each having said respective pole pieces in a path of a magnetic flux.

37. The radial gap type cylindrical motor as claimed in claim 36, wherein each of said pole pieces is formed in a rectangle and a breadth thereof is larger than that of a collar of said coil assembly.

* * * * *

UNITED STATES PATENT AND TRADEMARK OFFICE
CERTIFICATE OF CORRECTION

PATENT NO.  : 6,087,755
DATED       : July 11, 2000
INVENTOR(S) : Yuzuru Suzuki, et al.

It is certified that error appears in the above-identified patent and that said Letters Patent is hereby corrected as shown below:

Item [75] change "Shizuoka-ken" to -- Shizuoka --.

Column 11,
Line 34, change "$U \approx V$," to --$U \fallingdotseq V$--

Column 12,
Line 61, delete ")" (second occurrence).

Column 17,
Line 5, delete "of".

Signed and Sealed this

Twenty-first Day of August, 2001

*Attest:*

NICHOLAS P. GODICI
*Attesting Officer*  *Acting Director of the United States Patent and Trademark Office*